United States Patent
Liang

(10) Patent No.: US 11,792,710 B1
(45) Date of Patent: Oct. 17, 2023

(54) ENHANCED VEHICLE-TO-EVERYTHING (V2X) COMMUNICATIONS USING A SATELLITE/AIRBORNE INTERFACE

(71) Applicant: Toyota Jidosha Kabushiki Kaisha, Aichi-ken (JP)

(72) Inventor: Frank F. Liang, Chantilly, VA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 210 days.

(21) Appl. No.: 17/476,116

(22) Filed: Sep. 15, 2021

Related U.S. Application Data

(60) Provisional application No. 63/079,392, filed on Sep. 16, 2020.

(51) Int. Cl.
| | |
|---|---|
| *H04W 36/30* | (2009.01) |
| *H04W 4/40* | (2018.01) |
| *H04W 76/25* | (2018.01) |
| *H04W 72/543* | (2023.01) |
| *H04W 36/08* | (2009.01) |
| *H04B 17/318* | (2015.01) |

(52) U.S. Cl.
CPC .......... *H04W 36/30* (2013.01); *H04B 17/328* (2023.05); *H04W 4/40* (2018.02); *H04W 36/083* (2023.05); *H04W 72/543* (2023.01); *H04W 76/25* (2018.02)

(58) Field of Classification Search
CPC .......... H04W 4/40; H04W 4/44; H04W 4/46; H04W 4/70; H04W 72/543; H04W 76/25; H04W 36/00222; H04W 36/0083; H04W 36/083; H04W 36/1443; H04B 7/18508; H04B 7/18541; H04B 7/204; H04B 17/328

See application file for complete search history.

(56) References Cited

U.S. PATENT DOCUMENTS

| | | | | |
|---|---|---|---|---|
| 2022/0078693 | A1* | 3/2022 | Ly | H04W 36/30 |
| 2022/0173794 | A1* | 6/2022 | Konishi | H04W 16/30 |
| 2022/0174655 | A1* | 6/2022 | Tsai | H04W 4/40 |
| 2022/0417817 | A1* | 12/2022 | Wang | H04W 36/0055 |

OTHER PUBLICATIONS

ETSI TS 138 300, "Technical Specification: Overall description; Stage-2", 3GPP TS 38.300 version 15.8.0, Release 15, Jan. 2020, 102 pages (in two parts), downloadable from http://www.etsi.org/standards-search.

\* cited by examiner

*Primary Examiner* — Mohamed A Kamara
(74) *Attorney, Agent, or Firm* — Finnegan, Henderson, Farabow, Garrett & Dunner, LLP

(57) ABSTRACT

A system, method and apparatus for mobile communications including sidelink transmissions is provided. A user equipment (UE) maintains a first interface between the first UE and a radio access network (RAN) infrastructure node, a second interface between the first UE and a second UE and a third interface between the first UE and a satellite node or an airborne node. The UE switches between interfaces according to a current connectivity state and based on signal attributes associated with individual interfaces.

39 Claims, 23 Drawing Sheets

| Transport channel<br>Logical channel | BCH | PCH | DL-SCH |
|---|---|---|---|
| BCCH | X | | |
| PCCH | | X | |
| CCCH | | | X |
| DCCH | | | X |
| DTCH | | | X |

FIG. 3A

| Transport channel<br>Logical channel | UL-SCH | RACH |
|---|---|---|
| CCCH | X | |
| DCCH | X | |
| DTCH | X | |

FIG. 3B

| Transport channel<br>Logical channel | SL-BCH | SL-SCH |
|---|---|---|
| SBCCH | X | |
| SCCH | | X |
| STCH | | X |

FIG. 3C

| Physical channel | PDSCH | PDCCH | PBCH |
|---|---|---|---|
| Transport channel | | | |
| BCH | | | X |
| PCH | X | | |
| DL-SCH | X | | |

FIG. 4A

| Physical channel | PUSCH | PUCCH | PRACH |
|---|---|---|---|
| Transport channel | | | |
| UL-SCH | X | | |
| RACH | | | X |

FIG. 4B

| Physical channel | PSSCH | PSCCH | PSFCH | PSBCH |
|---|---|---|---|---|
| Transport channel | | | | |
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

ENHANCED VEHICLE-TO-EVERYTHING (V2X) COMMUNICATIONS USING A SATELLITE/AIRBORNE INTERFACE

CROSS-REFERENCE TO RELATED APPLICATION

This application claims the benefit of U.S. Provisional Application No. 63/079,392, entitled "ENHANCED VEHICLE-TO-EVERYTHING (V2X) COMMUNICATIONS USING A SATELLITE/AIRBORNE INTERFACE", and filed on Sep. 16, 2020. U.S. Provisional Application No. 63/079,392 is incorporated by reference herein.

BACKGROUND

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

DETAILED DESCRIPTION

Figure 1:
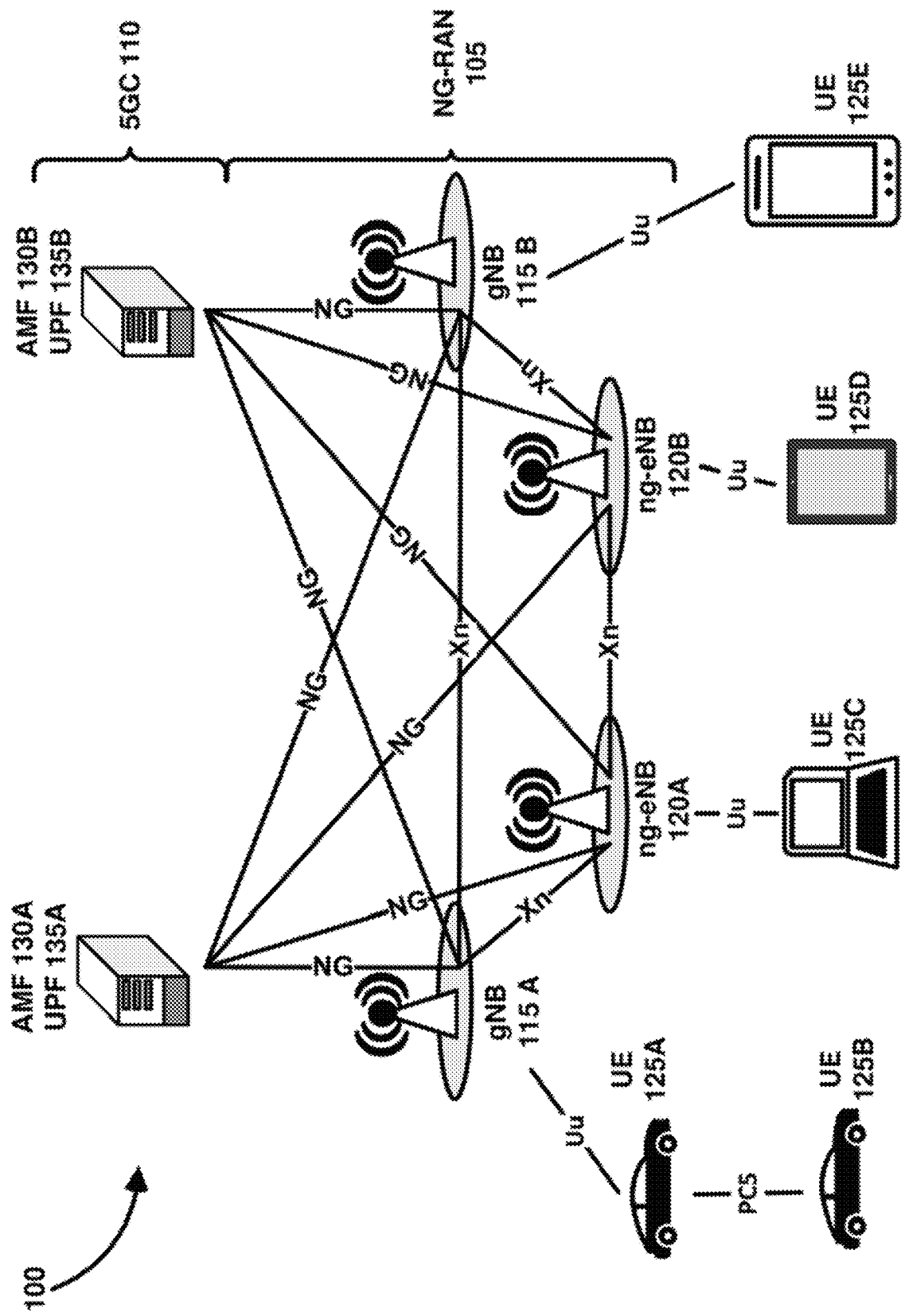
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (JOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (HOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception components for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
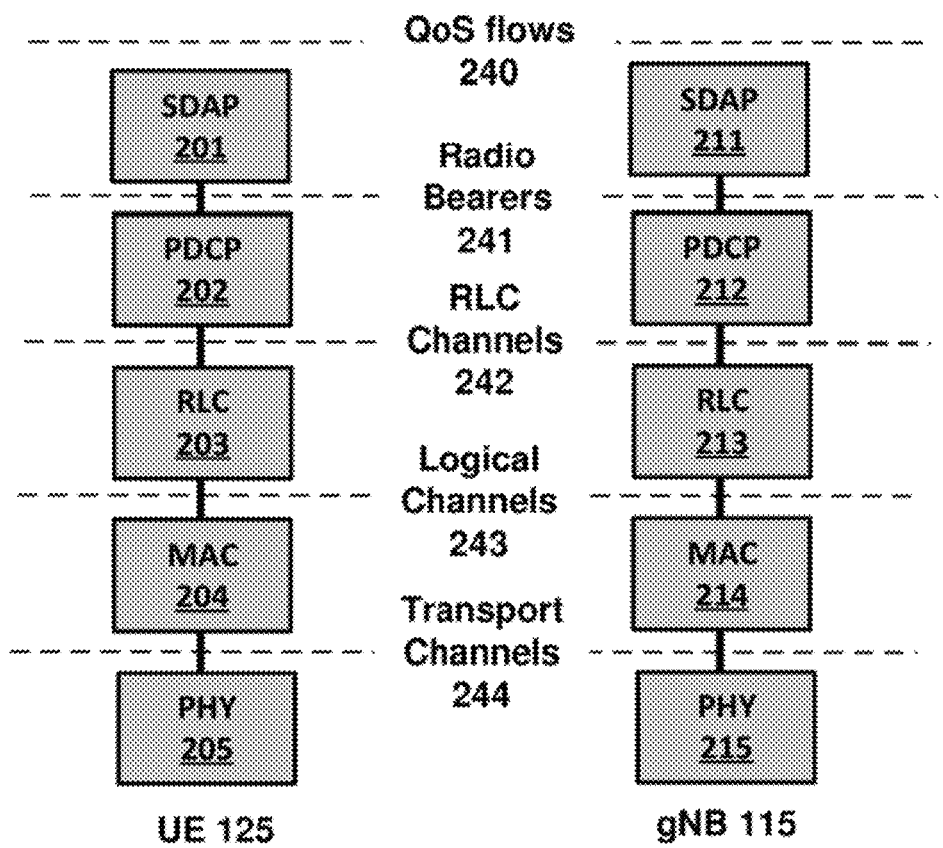
FIG. 2A and FIG. 2B show examples of radio protocol stacks for user plane and control plane, respectively, according to some aspects of some of various exemplary embodiments of the present disclosure.
Figure 2B:
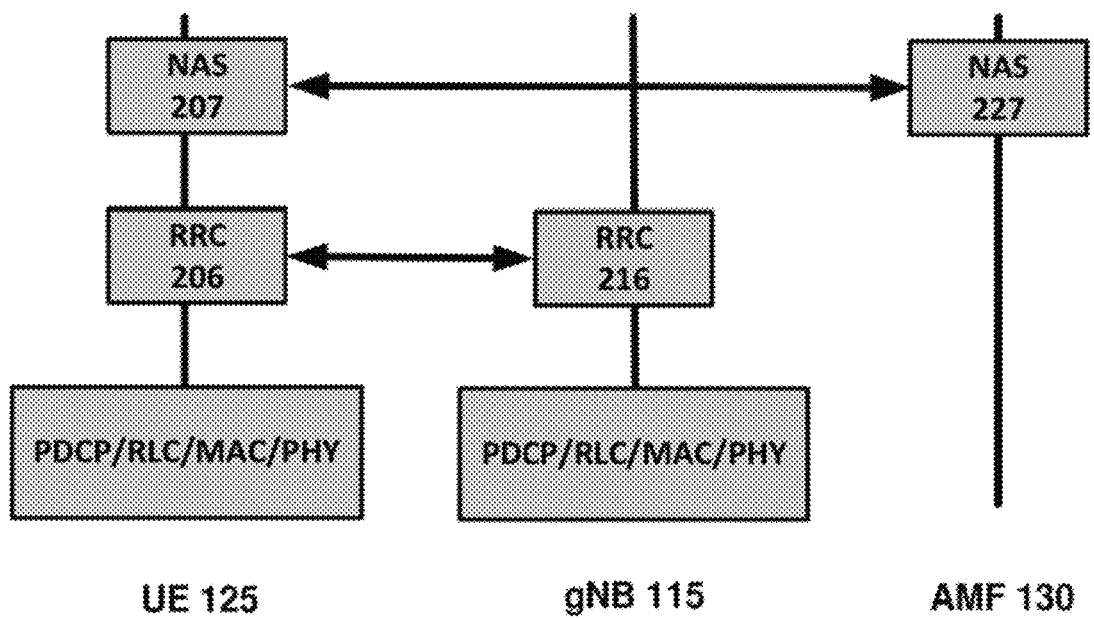

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figure 5A:
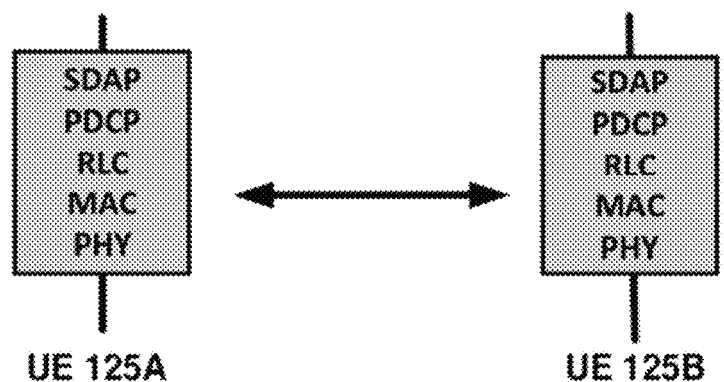
FIG. 5A, FIG. 5B, FIG. 5C and FIG. 5D show examples of radio protocol stacks for NR sidelink communication according to some aspects of some of various exemplary embodiments of the present disclosure.
Figure 5B:
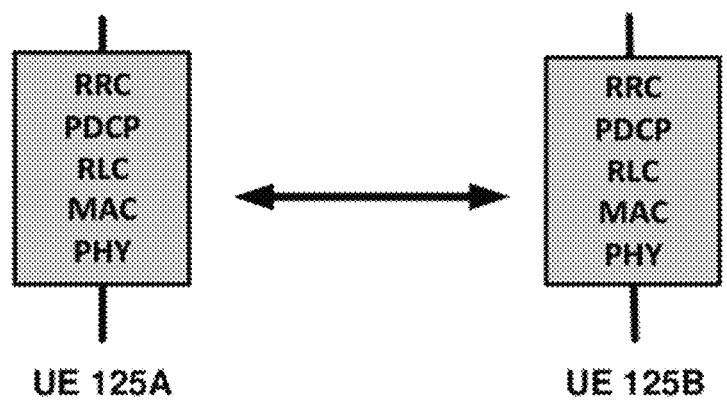
Figure 5C:
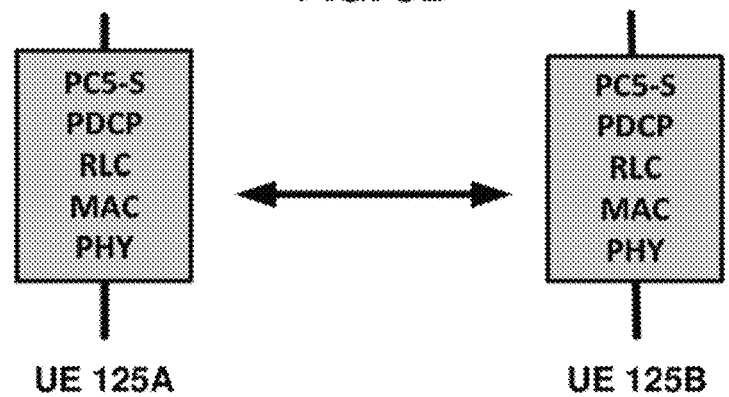
Figure 5D:
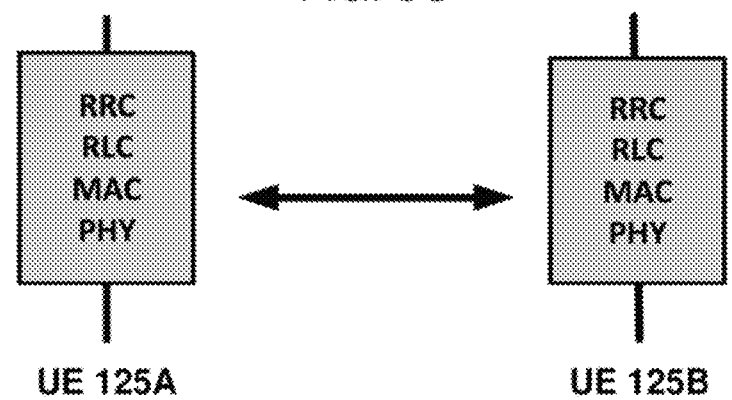

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
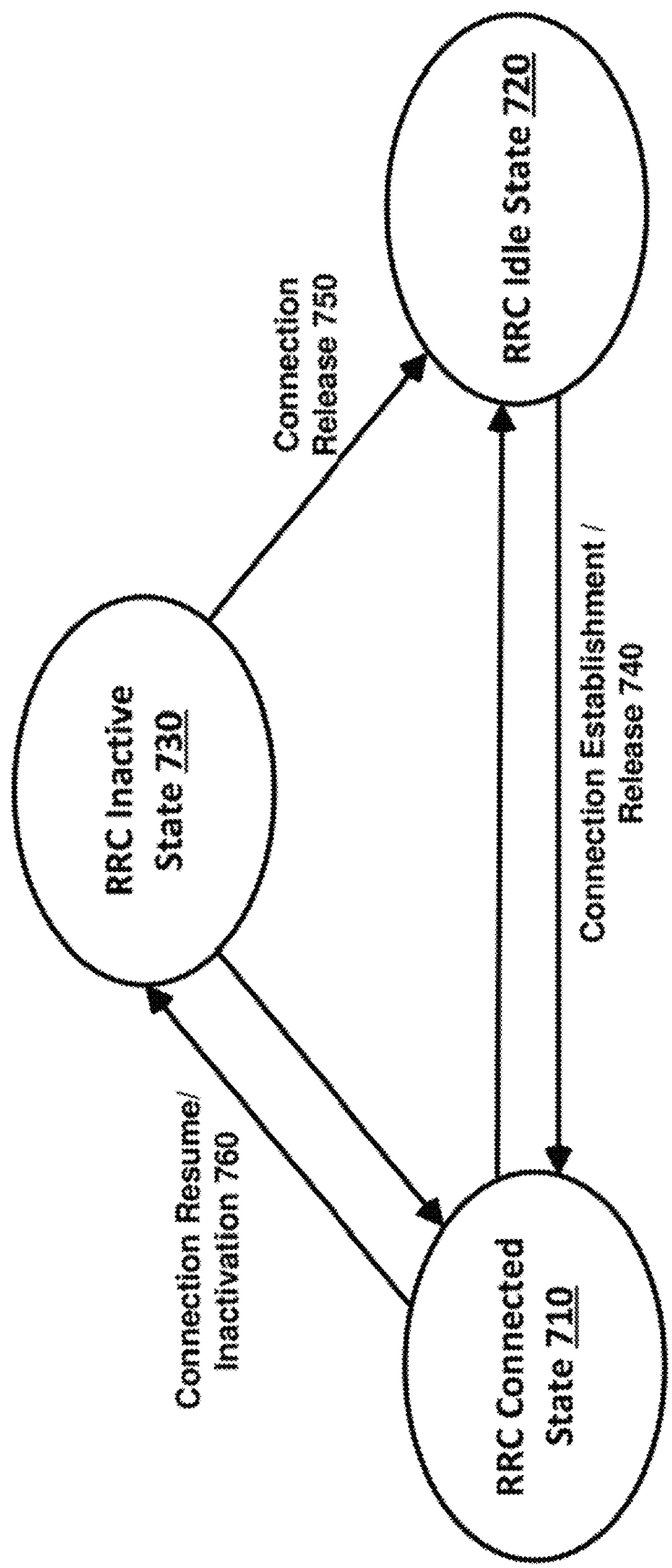
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
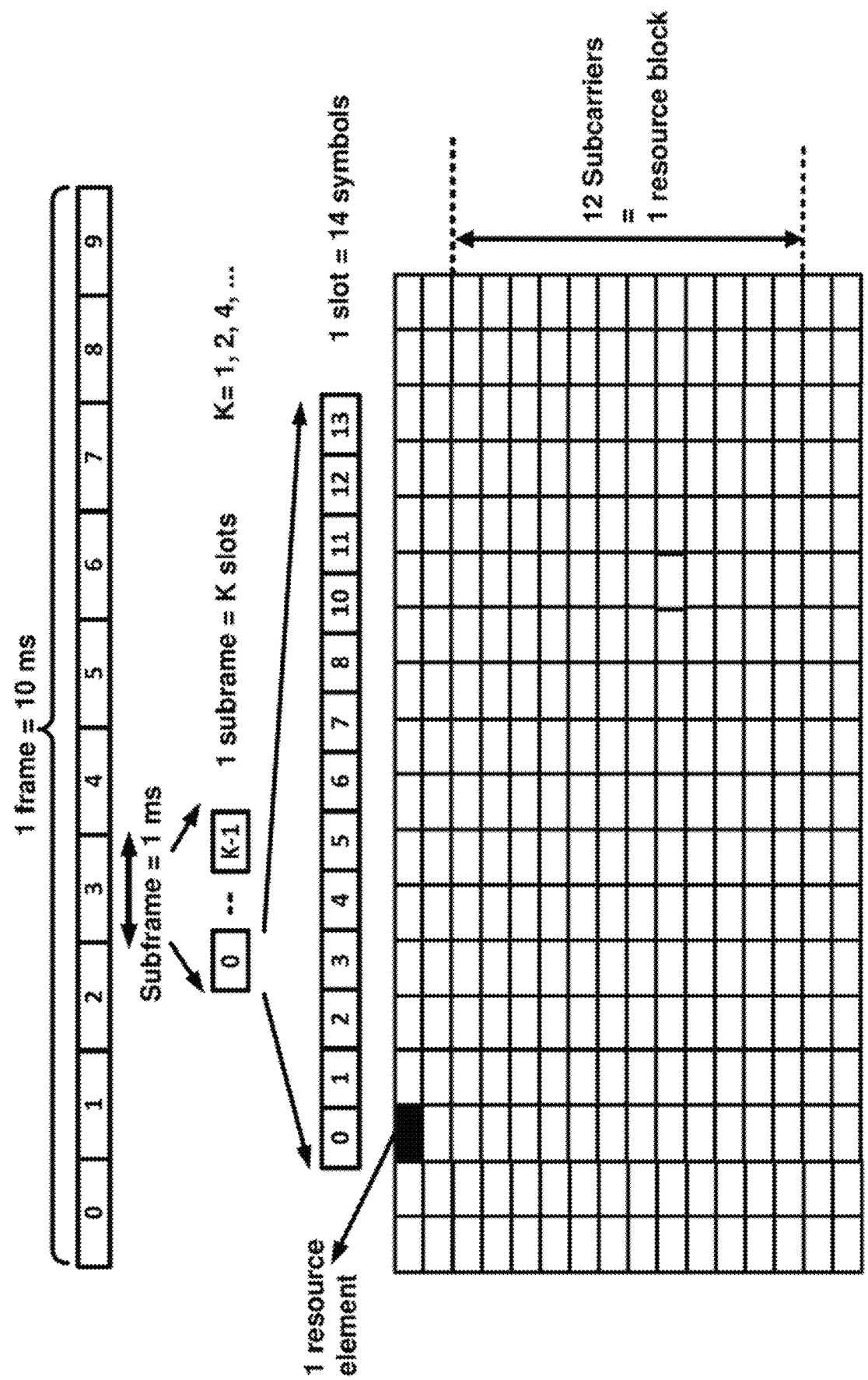
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
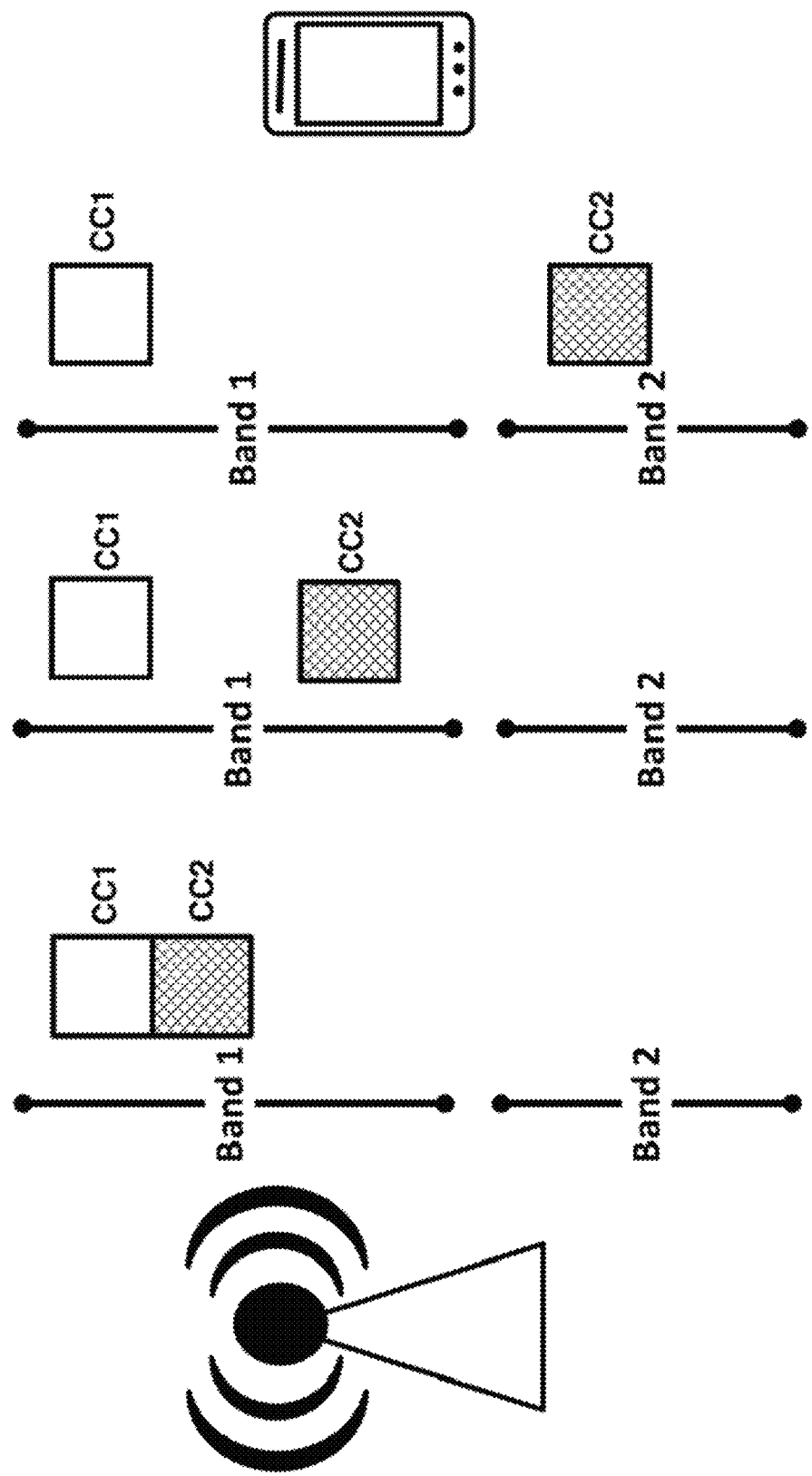
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC

CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
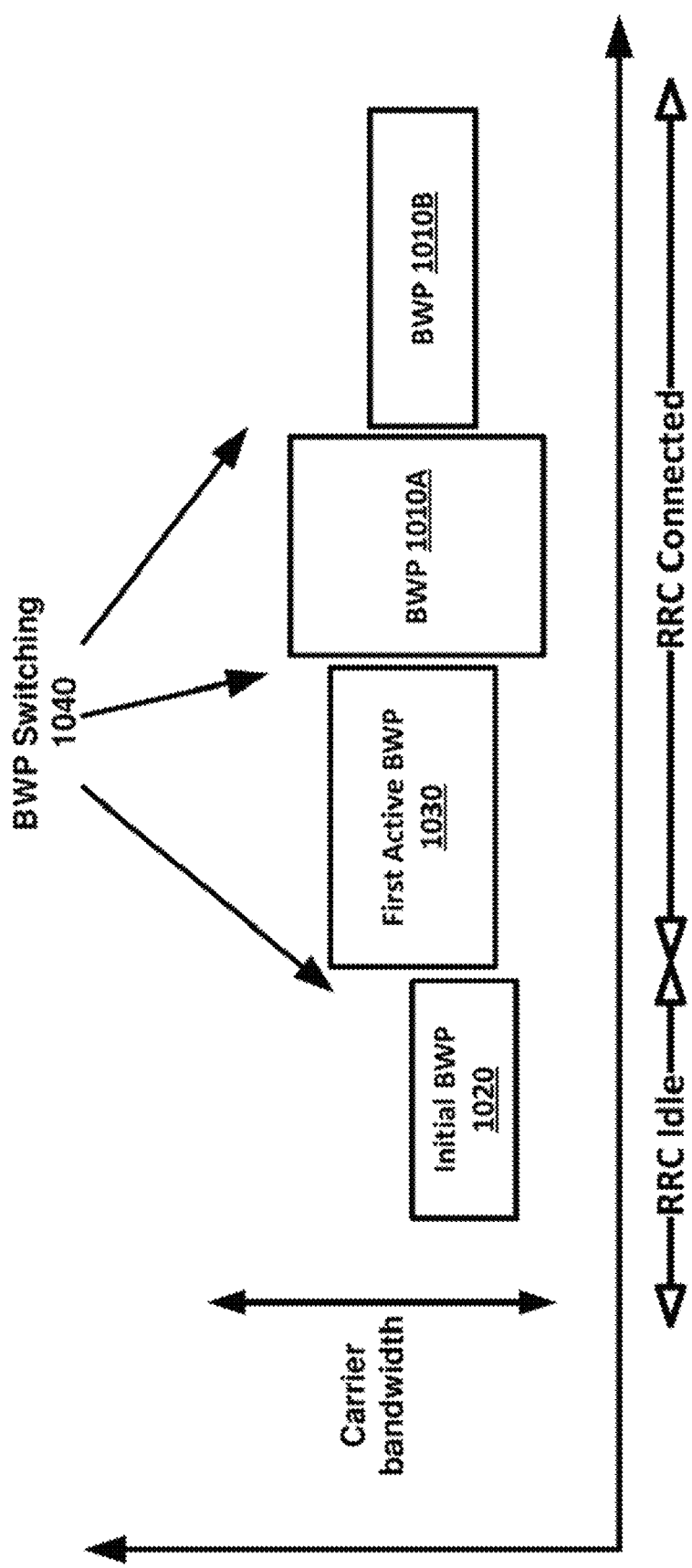
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
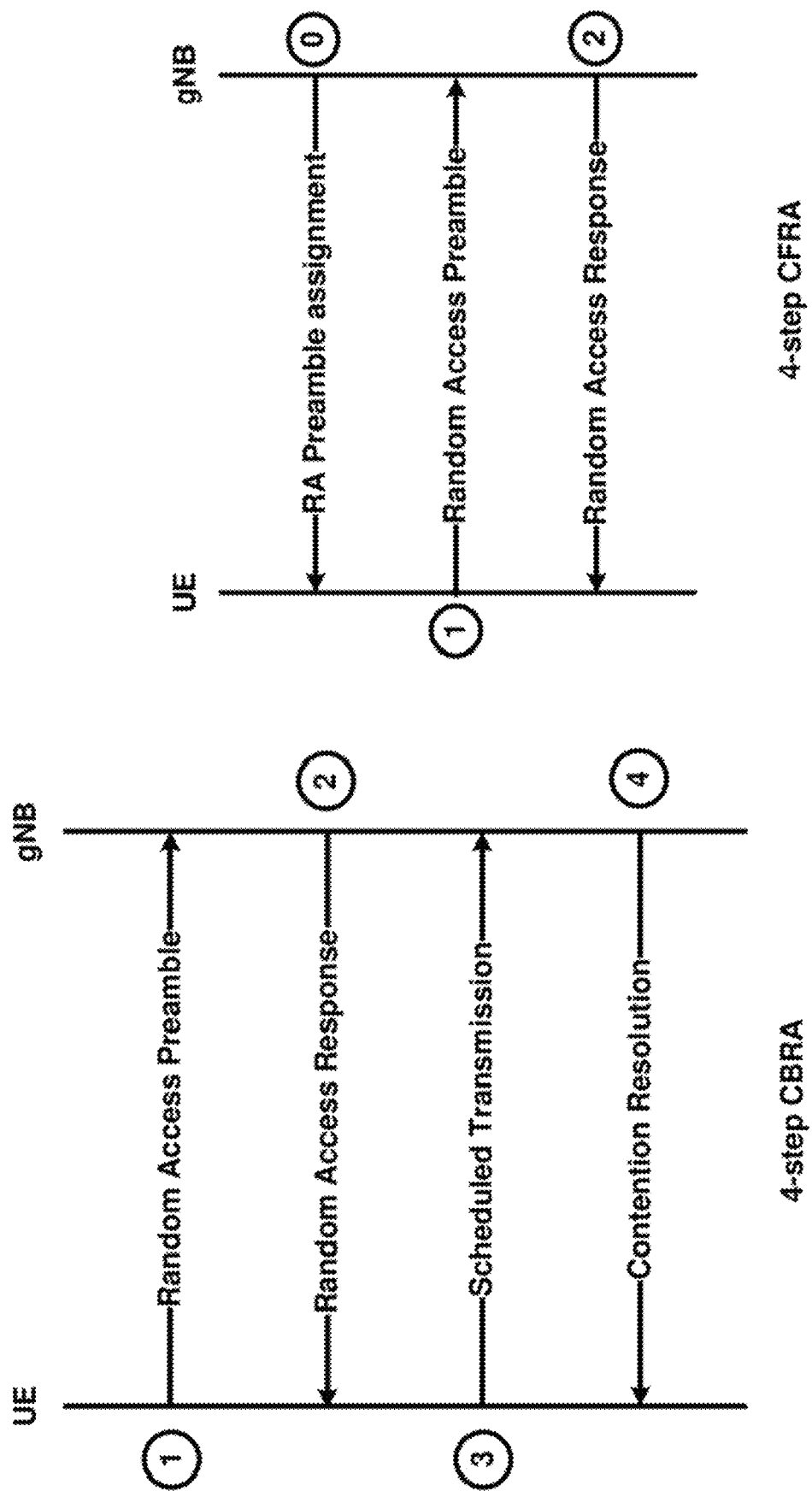
FIG. 11 shows example four-step contention-based and contention-free random access processes according to some aspects of some of various exemplary embodiments of the present disclosure.
Figure 12:
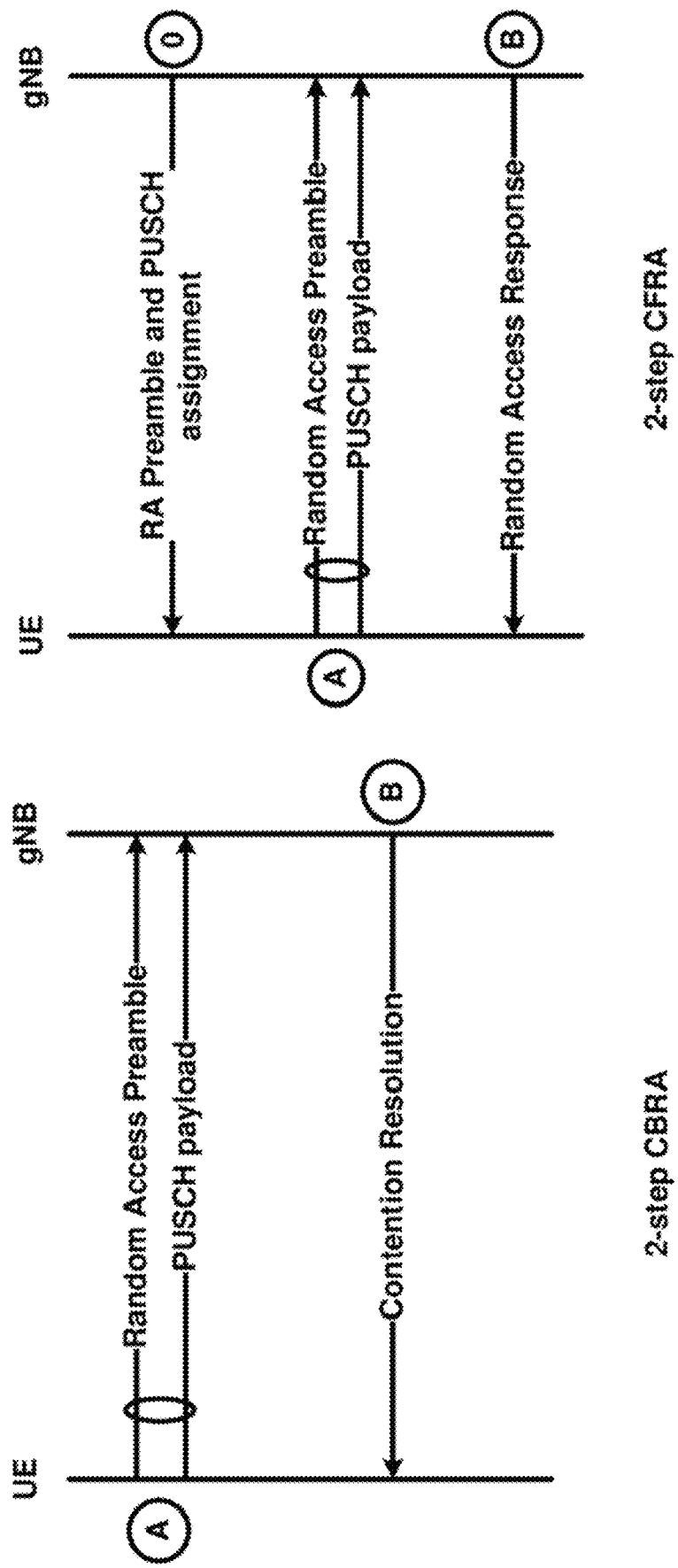
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re)transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
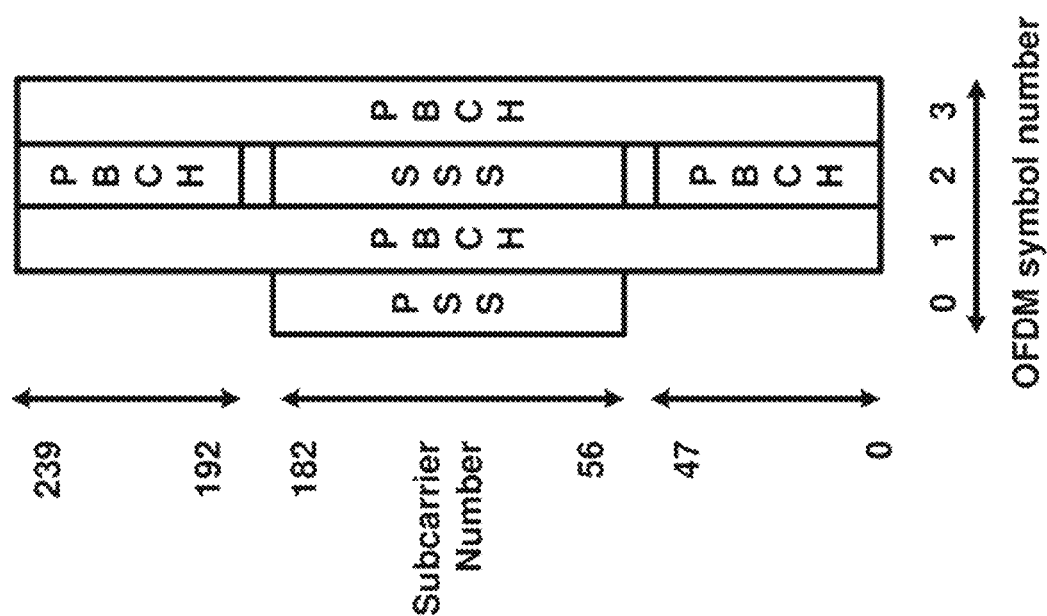
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e. using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBS) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
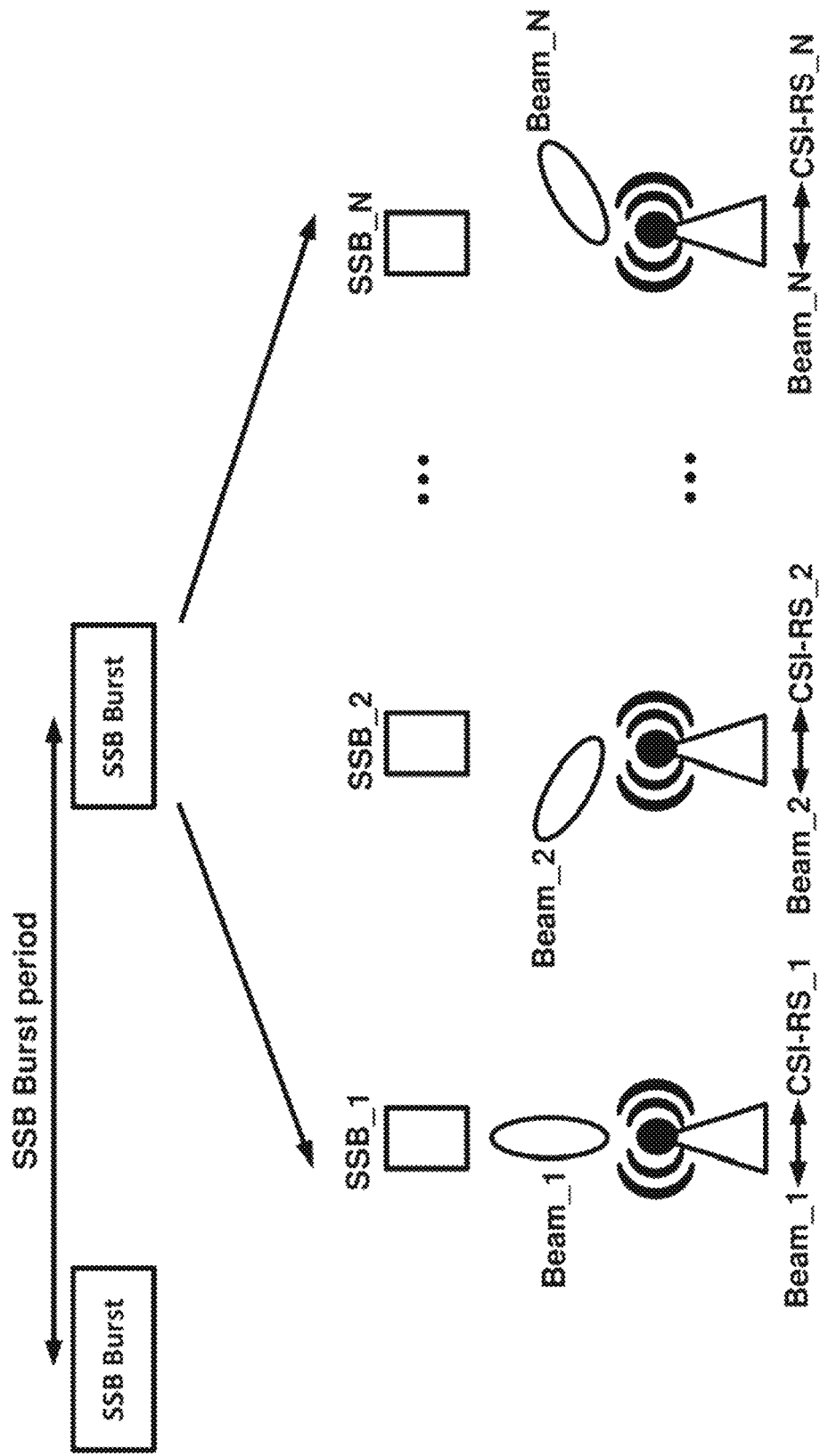
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
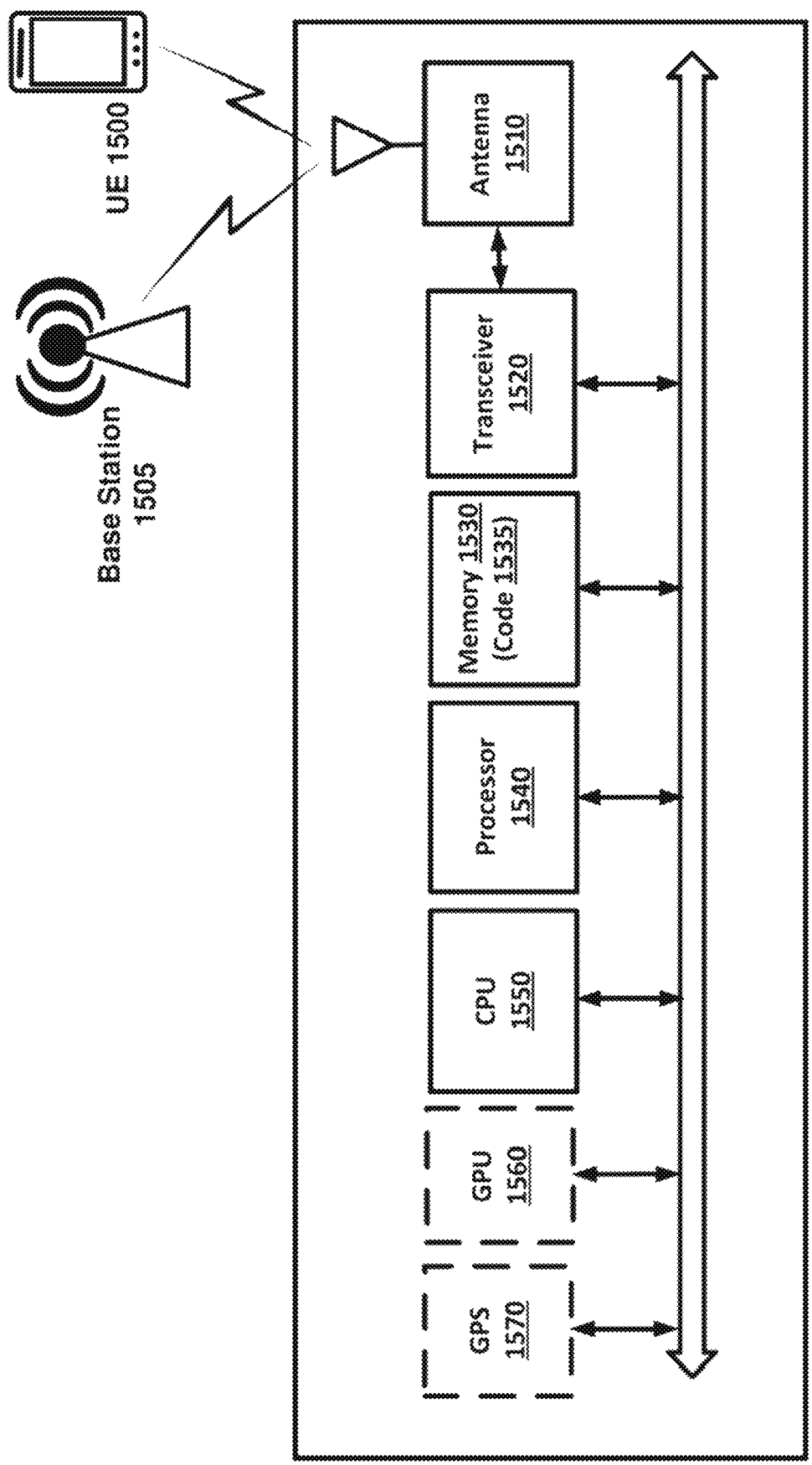
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment 1500. Accordingly, the components illustrated in FIG. 15 are not necessarily limited to either a user equipment or base station.

With reference to FIG. 15, the Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some embodiments, and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In some examples, concurrent operation between NR Uu band and NR PC5 band may be configured for a UE. In some examples, concurrent operation between LTE Uu band and NR PC5 band may be configured for a UE. In some examples, concurrent operation between NR Uu band and LTE PC5 band may be configured for a UE. In some example, concurrent operation of LTE/NR CA/DC band combinations and PC5 V2X band may be configured for a UE.

Example embodiments may utilize means for transport of V2X messages. V2X messages may be generated and consumed by upper layers of the UE and the V2X application server. V2X messages may contain IP data or non-IP data. The V2X messages may be transported using V2X communication over PC5; V2X communication over the Uu interface; and the V2X communication over the Satellite/Airborne interface.

V2X communication over PC5 may enable transfer of V2X messages among UEs. For V2X messages containing IP data, IPv6 may be used.

The V2X communication over Uu may enable transfer of V2X messages between a UE and a V2X application server. The V2X messages may be carried over the Uu interface in payload of a UDP/IP packet. A UE using V2X communication over the Uu interface: may use unicast transport (in uplink, downlink or both of them); may use multicast broadcast multimedia services (MBMS) transport (in downlink only); may use transport for uplink which is the same or different to the transport for downlink; and may use also MBMS transport for downlink without using any transport for uplink.

Example embodiments may enhance the V2X communications by utilizing a satellite/airborne interface in addition or instead of one or more of the Uu interface or the PC-5 interface.

In some examples, the UE may support requirements for securing V2X communication over PC5. The UE may support a privacy protection for the V2X communication over PC5 subject to regional regulatory requirements and/or operator policy for a V2X application. Both IP based and non-IP based V2X communication over PC5 may be supported. For IP based V2X communication, IPv6 may be used.

The upper layers may request the UE to send a V2X message of a V2X service identified by a V2X service identifier using V2X communication over PC5. The request from the upper layers may include one or more of: the V2X message; the V2X service identifier of the V2X service for the V2X message; the type of data in the V2X message (IP or non-IP); if the V2X message contains non-IP data, the V2X message family of data in the V2X message; the V2X message priority.

In some examples, the V2X communication over the Uu interface may be for V2X services identified by a V2X service identifier.

The upper layers may request the UE to send a V2X message of a V2X service identified by a V2X service identifier using V2X communication over the Uu interface. The request from the upper layers may include one or more of: the V2X message; the V2X service identifier of the V2X service for the V2X message; the type of data in the V2X message (IP or non-IP); and if the V2X message contains non-IP data, the V2X message family of data in the V2X message.

In some examples, a UE my operate according to a plurality of interfaces. An interface may operate using one or more frequency bands. The UE may be configured to operate on a plurality of frequency bands. The UE may be configured to operate using band combinations for Uu and V2X con-current operation.

In some examples, the Uu and PC5 interfaces and the frequency bands that the Uu and PC-5 interfaces operate may not provide sufficient coverages. For example, in some rural areas, a UE may not establish a Uu interface due to coverage holes. The configured interfaces (e.g., the Uu interface and/or the PC-5 interface) may be not be available in a certain geographical region or may be available intermittently due to mobility. This may result in inefficient UE performance, for example for transmission of safety related messages or high priority messages and may lead to Coverage issues. There is a need to enhance the UE performance when one or more UE configured interfaces are not available and/or operate inefficiently.

Example embodiments introduce additional UE interfaces (e.g., satellite and/or airborne interfaces) that may be utilized dynamically and may enhance the UE performance and enable reliable V2X services on safety, vehicle operations management, autonomous driving, traffic efficiency, environmental friendliness, etc.

Figure 16:
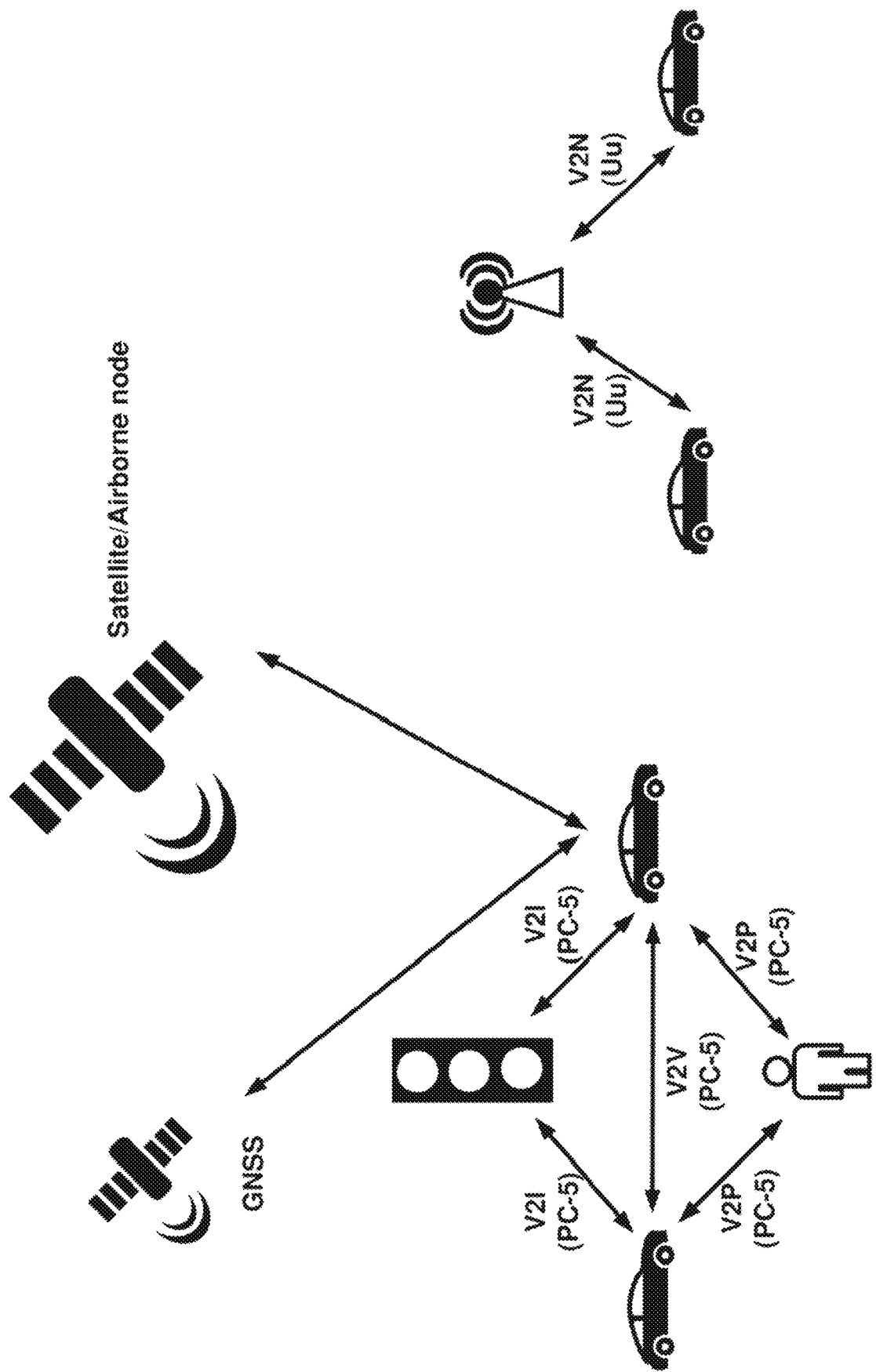
FIG. 16 shows example vehicular communications scenarios including a satellite and airborne node according to some aspects of some of various exemplary embodiments of the present disclosure.

In some examples as shown in in FIG. 16, a UE (e.g., a V2X UE) may detect Uu and PC5 signals and may also detect satellite/airborne signals that enable larger coverage. In an example scenario, a UE may establish an interface with a Satellite and/or Airborne node or may establish a connection/interface with a Global Navigation Satellite System (GNSS) (for example for the purpose of synchronization and/or updating UE connection status). The UE may be configured with and/or may utilize a plurality of interfaces, for example a Uu interface with a RAN node (such as a base station, for example for vehicle to network (V2N) communications), a PC-5 interface with a pedestrian (for vehicle to pedestrian (V2P) communications), a PC-5 interface with a vehicle (for example for a vehicle to vehicle (V2V) communications), a PC-5 interface with an infrastructure node (for example for a vehicle to vehicle (V2V) communications).

In some examples, a UE (e.g., a V2X UE) may detect PC5 and Uu signal fading. The UE may make a decision on switchover to and/or utilizing a satellite/airborne interface, for example within a switching time mask. The signal fading may be based on A1-A6 events and B1-B2 events, e.g. use 'Serving becomes worse than threshold'-A2 Event, or 'Inter RAT neighbour becomes better than threshold'-B1 Event, etc.

In some examples, the downlink data information already in a buffer (e.g., a logical channel/RLC/PDCP buffer) associated with the UE or a buffer associated with a node that communicates with the UE (e.g., another UE, a RAN node, an infrastructure node) may be forward to/from the UE (e.g., a V2X UE) based on priorities. The UE can resend/receive the data packets in the buffer via a connection with satellite/airborne node.

In some examples, when the V2X UE powers on, it may attach, register, and establish a session with Sat/Airborne, and maintain the session: when the UE detects a Sat/Airborne signals, or when the UE detects Uu and PC5 signals fade away.

Figure 17:
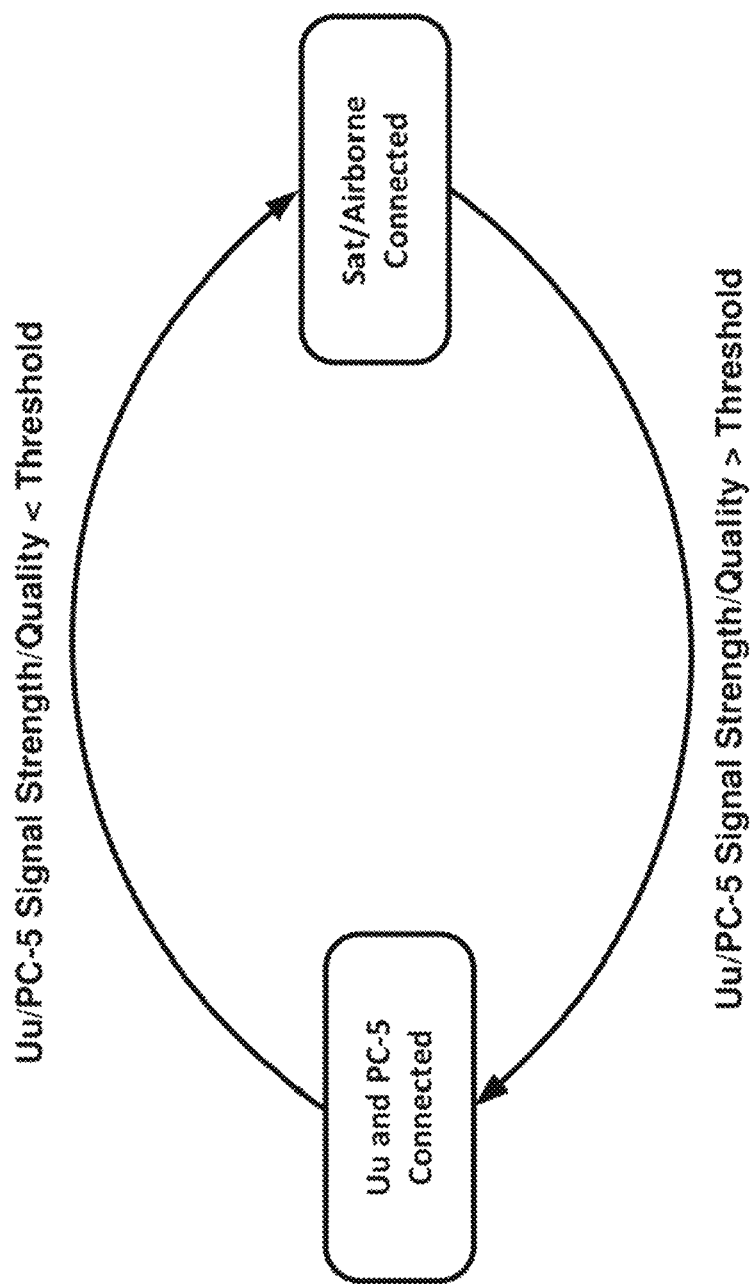
FIG. 17 shows example connectivity states and state transitions according to some aspects of some of various exemplary embodiments of the present disclosure.

In some examples as shown in FIG. 17, the UE may have two states: (1) a Uu and PC5 Connected, and (2) a Sat/Airborne Connected state. The UE may switch between the two states based on Uu/PC5 signal strength measurements such as RSRP, and/or signal quality such as RSRQ and SINR. If the signal strength lasts certain period of time meeting signal quality requirements, the UE may switch its state. In some examples, a V2X UE may be synchronized with the GNSS in any states.

In some examples, due to limited bandwidth and ~500 ms latency on Sat/Airborne platform, the V2X data packets may comprise priority tags. In some example, the priority may be defined by network operator based on applications. Examples of priorities may include/indicate safety related information, firefighters, government agencies, autonomous driving information, and traffic efficiency information. In some example, high priority data packets may be transmitted and received in a Sat/Airborne Connected state.

Figure 18:
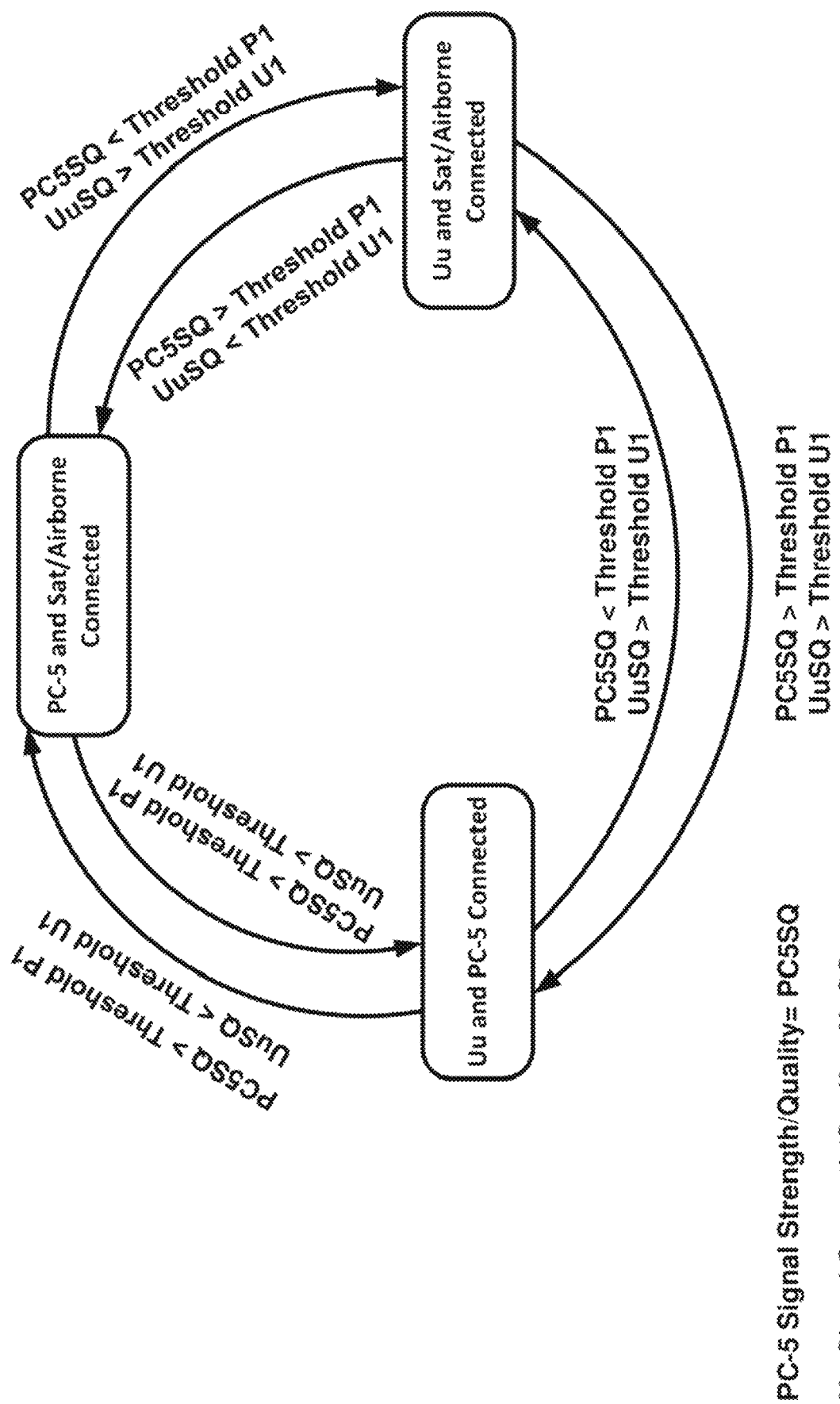
FIG. 18 shows example connectivity states and state transitions according to some aspects of some of various exemplary embodiments of the present disclosure.

In some examples, a PC5 interface may be available and a Uu interface may not available. In some examples, a Uu interface may be available and the PC5 interface may not be available. In some examples as shown in FIG. 18, the following connectivity states may be defined: (1) a Uu and PC5 Connected state, (2) a PC5 and Sat/Airborne Connected state, and (3) a Uu and Sat/Airborne Connected state. In some examples as shown in FIG. 18, depending on the signal strength/quality of the PC5 and/or the Uu interfaces, the UE may be switched over among the three states.

Figure 19:
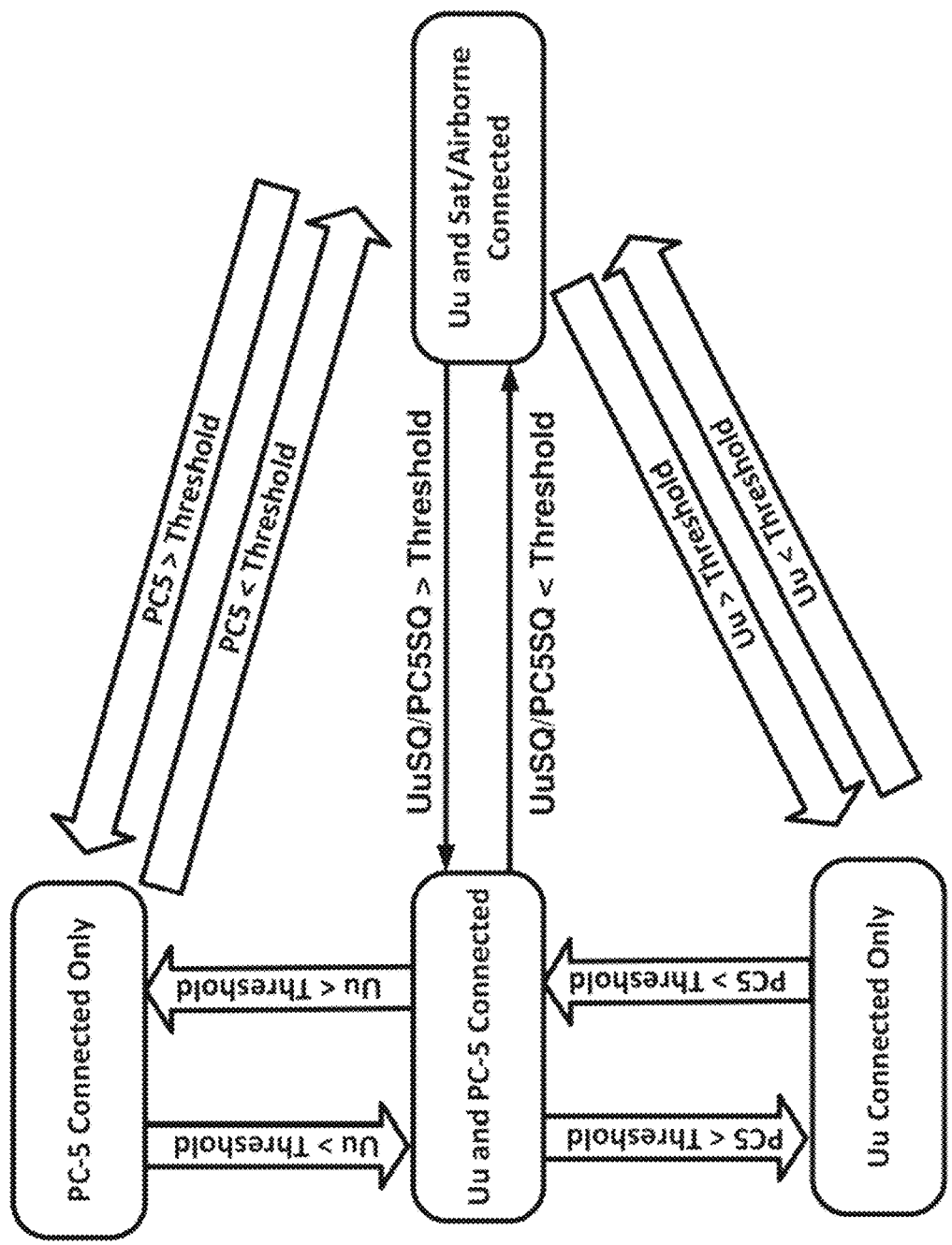
FIG. 19 shows example connectivity states and state transitions according to some aspects of some of various exemplary embodiments of the present disclosure.
Figure 20:
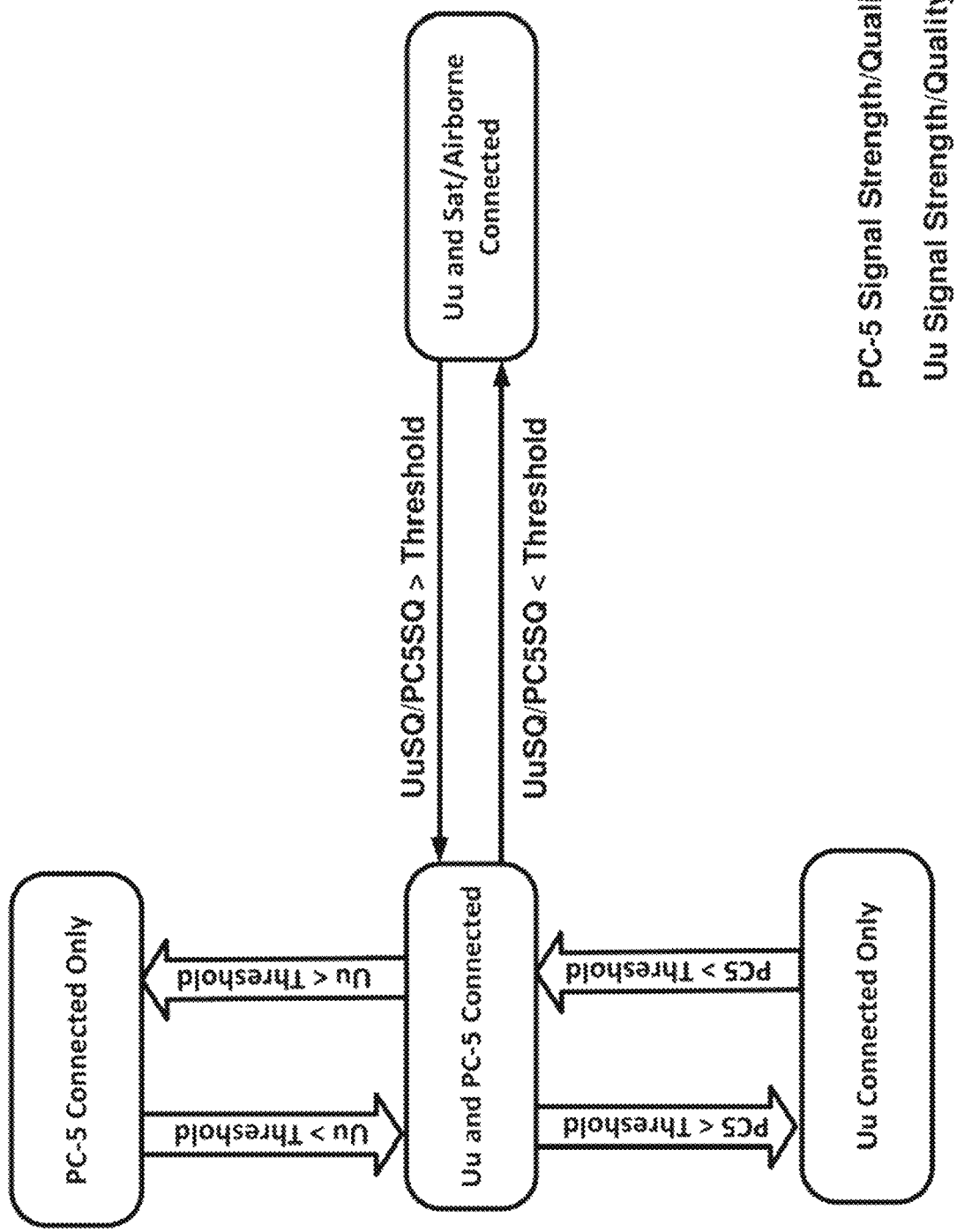
FIG. 20 shows example connectivity states and state transitions according to some aspects of some of various exemplary embodiments of the present disclosure.

In some example, as shown in FIG. 19 and FIG. 20, the UE may be in one of four states: (1) a Uu and PC5 Connected state, (2) a Sat/Airborne Connected state, (3) a Uu Connected Only state, and (4) a PC5 Connected Only state. The UE may switch between the four states depending on signal strength/quality. In some examples, as shown in FIG. 20, the Uu Connected Only state and the PC5 Connected Only state may not be switched to the Sat/Airborne Connected state.

In some examples, some of the messages and procedures used for the V2X communications over the Uu interface or the PC-5 interface may be utilized for V2X communications over the Satellite/Airborne interface. In some examples, the Sat/Airborne interface may share, with the Uu and/or the PC-5 interface, the Core Network functions associated with the V2X communications and the V2X application server.

Figure 21:
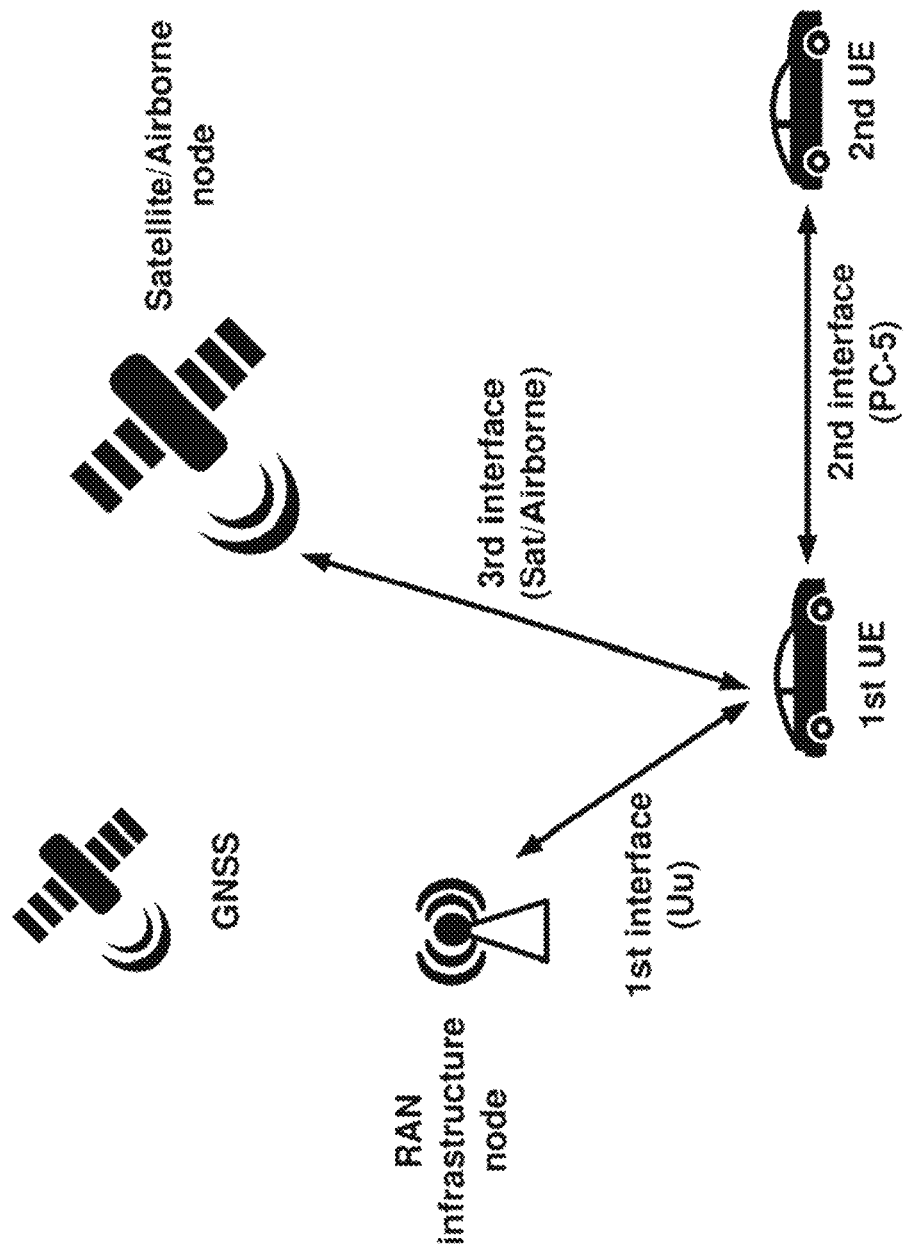
FIG. 21 shows example interfaces configured for a user equipment (UE) according to some aspects of some of various exemplary embodiments of the present disclosure.
Figure 22:
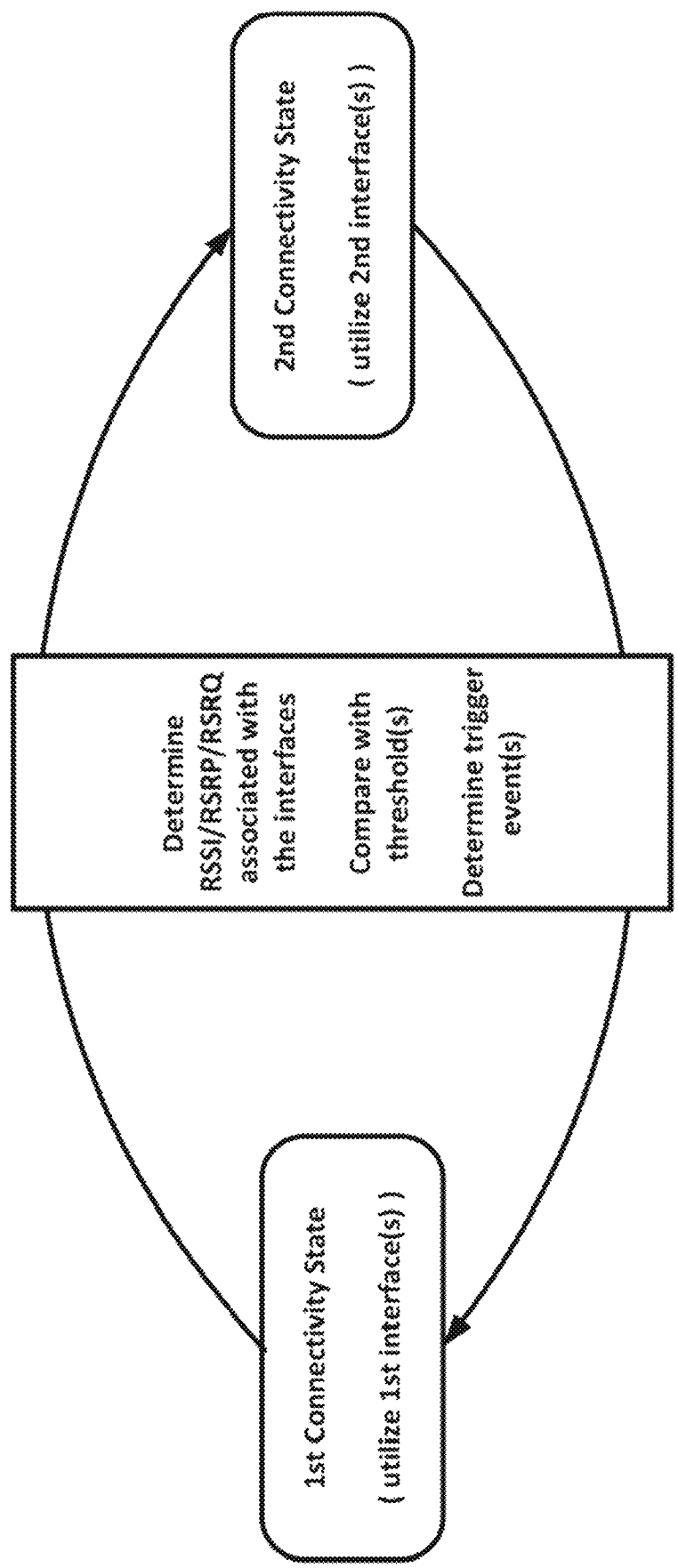
FIG. 22 shows connectivity states and state transitions according to some aspects of some of various exemplary embodiments of the present disclosure.

In an example embodiment as shown in FIG. 21 and FIG. 22, a first UE may be configured with and may be equipped with transceivers to operate based on one or more interfaces of a plurality of interfaces. The first UE may be configured to transmit and receive data to and from a RAN infrastructure node (e.g., a base station, a relay node, etc.). The first UE may be a V2X UE and may be configured with sidelink communications capabilities. The first UE may be configured with and may have the capability to communicate using a satellite/airborne interface/connection. The communications with the RAN infrastructure node, on the sidelink and with the satellite/airborne interface/connection may be registered with a Core Network (e.g., a common Core Network shared by all three interfaces). The first UE may register the connectivity on the first interface and/or the connectivity on the second interface and/or the connectivity on the third interface with the Core Network. The Core Network may establish, for the first UE, the UE context associated with the first interface, the second interface and the third interface. The Core Network man update the UE context for the first UE based on the connectivity state of the first UE. In some examples, the first UE may receive first configuration parameters for transmissions/reception to/from the RAN infrastructure node, second configuration parameters for transmissions/receptions via the sidelink and third configuration parameters for transmissions/receptions to/from the satellite/airborne node. In some examples, the first UE may determine the first configuration parameters, the second configuration parameters and the third configuration parameters, for example based on receiving one or more RRC messages comprising the first, the second and the third configuration parameters from the RAN infrastructure node.

The first UE may be configured to maintain/establish a Uu interface with the RAN infrastructure node (e.g., the base station, the relay node, etc.), for example using the first configuration parameters. The Uu interface may utilize first plurality of protocol terminations (e.g., first Physical layer, first MAC/one or more first L2 sublayers, etc.) between the first UE and the RAN infrastructure node.

The first UE may be configured to maintain/establish a PC-5 interface with a second UE (e.g., a second V2X UE for V2V communications, a second pedestrian for V2P communications, a second infrastructure node for V2I communications, etc.), for example using the second configuration parameters. The PC-5 interface may utilize second plurality of protocol terminations (e.g., second Physical layer, second MAC/one or more second L2 sublayers, etc.) between the first UE and the second UE.

The first UE may be configured to maintain/establish a Satellite/Airborne interface with a Satellite/Airborne node, for example using the third configuration parameters. The Satellite/Airborne interface may utilize third plurality of protocol terminations (e.g., third Physical layer, third MAC/one or more third L2 sublayers, etc.) between the first UE and the Satellite/Airborne node.

The first UE may maintain the first interface, the second interface and the third interface based on receiving one or more messages from the Core Network or the RAN infrastructure node, e.g., based on application layer signaling, RRC signaling, MAC/PHY signaling, etc. The Core Network/RAN infrastructure node may direct to establish a connection/interface with one or more of a plurality of interfaces. In some example, the first UE may determine to establish one or more connections using one or more of the plurality of interfaces and may autonomously operate on the one or more interfaces based on this determination. The first UE may indicate to the Core Network/RAN node and may register with the Core Network for the one or more interfaces. In some examples, the first UE may determine operating on the one or more interfaces based on measurements of one more references signals associated with the plurality of interfaces. In some examples, the first UE may be directed to transmit its measurement results (e.g., in a measurement report) to the RAN infrastructure node or the Core Network and may be directed to establish a connection on an interface or to disconnect on another interface.

The state of the connection of the first UE on its interfaces may be characterized by connectivity states. For example, a first connectivity state may utilize and may operate via one or more interfaces selected from the plurality of interfaces. A second connectivity state may utilize and may operate via one or more interfaces also selected from the plurality of interfaces. The UE can utilize the identified interfaces for communication of data packets, such as V2X data packets. Additionally, depending on different embodiments, the set of interfaces that can be associated with connectivity states can vary. Various implementations of associated interfaces to connectivity states are described herein. Accordingly, reference to the interfaces in illustrative connectivity states (e.g., a first connectivity state or a second connectivity state) should be construed as limiting.

The first UE may switch between the connectivity states (e.g., between the first connectivity state and the second connectivity state) based on one or more conditions. For example, the first UE may determine a first received signal strength or a first signal quality associated with the first interface (e.g. a first signal attribute), a second received signal strength or a second signal quality associated with the second interface (e.g., a second signal attribute), a third received signal strength or a third signal quality associated with the third interface (e.g., a third signal attribute). The first UE may determine to switch between the connectivity states based on the measurement results. The first UE may determine to switch between the connectivity states based on the first received signal strength or the first signal quality, the second received signal strength or the second signal quality, and the third received signal strength or the third signal quality. The first UE may synchronize with a Global Navigation Satellite System (GNSS) the status of its connectivity state (e.g., whether the first UE is in the first connectivity state or in the second connectivity state).

In some examples, the first UE may determine the need for switching to a second connectivity state from a first connectivity state and may indicate to the Core Network/RAN node. The Core Network/RAN node may confirm the switching and the switching, by the first UE, from the first connectivity state to the second connectivity state may be based on receiving the confirmation.

In some examples, the first UE may report (e.g., in a measurement report) the first received signal strength or a first signal quality associated with the first interface, and/or a second received signal strength or a second signal quality associated with the second interface, and/or a third received signal strength or a third signal quality associated with the third interface. The first UE may receive a command or a message indicating the switching from the first connectivity state to the second connectivity state based on transmitting the report. In an example, the first UE may receive the command/message indicating the switching via the Uu interface. In an example, the first UE may receive the command/message via any interface. In an example, the indication to switch between any two state may be via a MAC CE. In an example, the indication two switch may be via physical layer signal (e.g., a DCI). In an example, the indication to switch between any two state may be based on receiving an RRC message (e.g., RRC reconfiguration message) or an application layer message (e.g., from a V2X server).

In an example, in the first connectivity state, the first UE may utilize the first interface (e.g., the Uu interface for communications with the RAN node) and the second interface (e.g., the PC-5 interface for communication with the second UE for example, in a V2V, V2P or V2I communications mode). In the second connectivity state, the first UE may utilize the third interface, e.g., the interface between the first UE and the Satellite/Airborne node. The first UE may be in either of the first connectivity state or the second connectivity state based on signal level/quality associated with the corresponding interfaces.

In an example, the first UE may determine the signal strength associated with an interface based on a reference signal strength indicator (RSSI). The first UE may be configured with one or more references signals for the first interface and for determining the RSSI value associated with the first interface. In an example, the RSSI may measure the average total received over observed in OFDM symbols containing reference symbols for an antenna port in the measurement bandwidth over N resource blocks.

In an example, the first UE may determine the signal strength associated with an interface based on a reference signal received power (RSRP). The first UE may be configured with one or more references signals for the first interface and for determining the RSRP value associated with the first interface. The RSRP may be determined based on the power of the Reference Signals spread over the full bandwidth and narrowband.

In an example, the first UE may determine the signal quality associated with an interface based on a reference signal received quality (RSRQ). The first UE may be configured with one or more references signals for the first interface and for determining the RSRQ value associated with the first interface. The RSRQ may indicate a quality considering RSSI and the number of used Resource Blocks (N) RSRQ=(N*RSRP)/RSSI measured over the same bandwidth. RSRQ may be indicates the quality of the received reference signal. The RSRQ measurement may provide additional information when RSRP is not sufficient to make a reliable connectivity state transition/switching.

In some examples, the first UE may compare the first received signal strength or the first received signal quality with a first threshold. The first UE may compare the second received signal strength or the second received signal quality with a second threshold. The first UE may compare the third received signal strength or the third received signal quality with a third threshold. The first UE may determine to switch from the first connectivity state to the second connectivity state based on results of the comparing. The first threshold, the second threshold and the third threshold may have predetermined values or may be preconfigured. In some examples, the first threshold, the second threshold and the third threshold may be configured. For example, the first UE may receive configuration parameters indicating the first threshold, the second threshold and the third threshold. The first UE may receive one or more messages (e.g., RRC messages) indicating the first threshold, the second threshold and the third threshold. The first UE may receive the one or more messages via the Uu interface and from the RAN Node.

In some examples, the switching between the first connectivity state and the second connectivity state may be based on one or more trigger events. The trigger events for determining to switch between the connectivity states may be shared with and/or may be like the trigger events used for mobility purposes (e.g., for changing the serving base stations or handover decisions as the first UE moves). Example trigger events include event A1 (Current interface becomes better than threshold), event A2 (Current interface becomes worse than threshold), event A3 (Other interface becomes offset better than current interface), event 4 (Other interface becomes better than threshold), event A5 (Current interface becomes worse than threshold 1 and other interface becomes better than threshold 2), event A6 (Other interface becomes offset better than current interface), event B1 (Inter RAT neighbor becomes better than threshold), event B2 (Current interface becomes worse than threshold 1 and inter RAT neighbor becomes better than threshold 2), etc.

Figure 23:
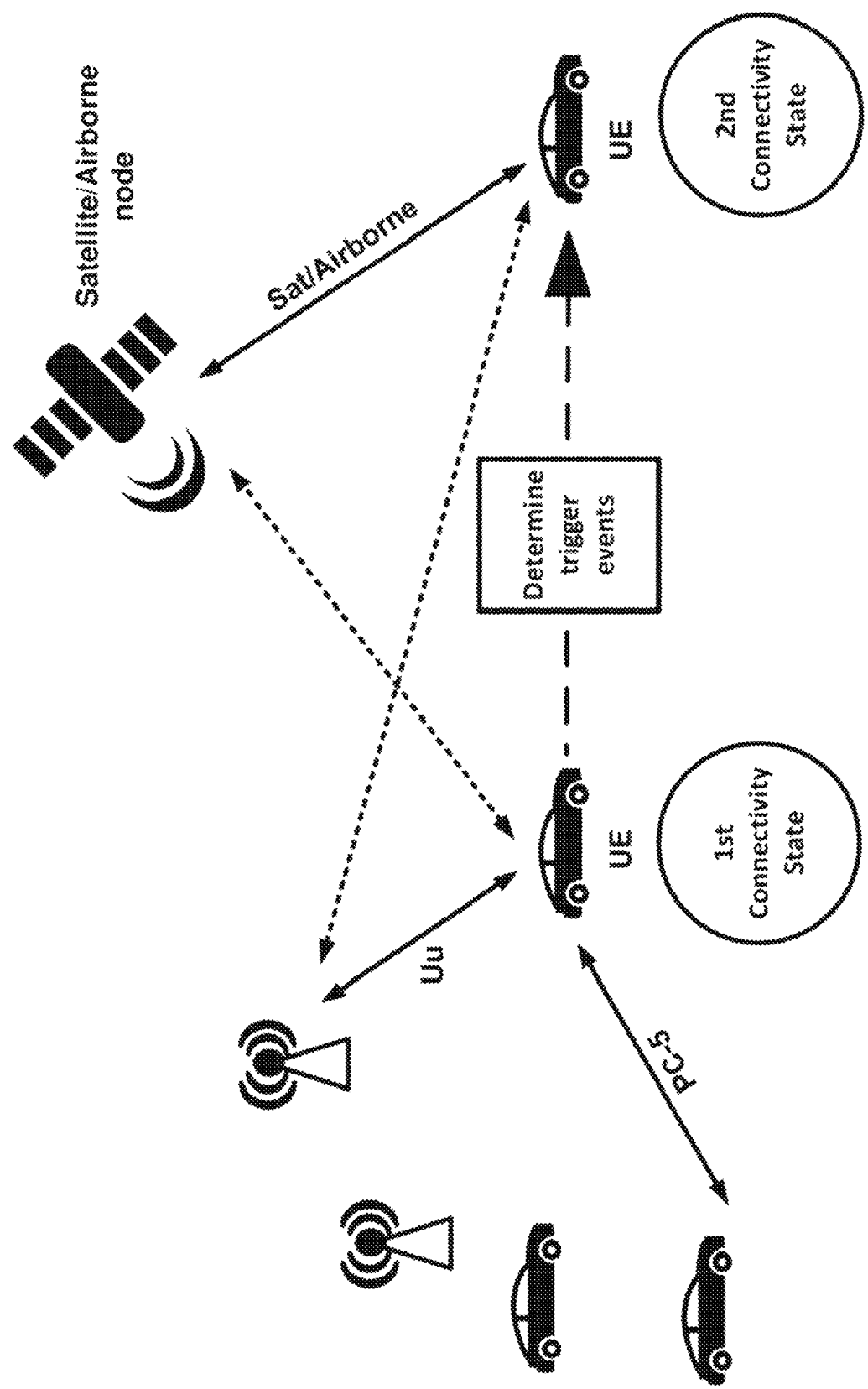
FIG. 23 shows an example connectivity state switching process according to some aspects of some of various exemplary embodiments of the present disclosure.

An example connectivity state switching from a first connectivity state, wherein the first UE utilizes the first interface (Uu) and the second interface (PC-5) to the second connectivity state, wherein the first UE utilizes the satellite/airborne interface is shown in FIG. 23. The first UE may move from an area with good coverage for the Uu and the PC-5 interface to an area with poor coverage of the Uu and the PC-5 interface. The first UE may determine to switch from the first connectivity state to the second connectivity state based on one or more trigger events determined based on signal strengths/qualities associated with the Uu, PC-5 and the Satellite/Airborne interfaces. For example, the first UE may switch from the Uu/PC-5 connected state to the satellite/airborne interface based on the signal strength/quality associated with the Uu and/or PC-5 interfaces dropping below one or more corresponding thresholds.

In some examples, the switching between the first connectivity state and the second connectivity state may be based on a duration that the signal strength or quality associated with an interface remains above a threshold. For example, the switching the connectivity state may be based on one or more of: a first duration that the first received signal strength or the first signal quality maintains a first signal strength or signal quality requirement (for example, the first received signal strength or the first signal quality being above the first threshold), a second duration that the second received signal strength or the second signal quality maintains a second signal strength or signal quality requirement (for example, the second received signal strength or the second signal quality being above the first threshold), a third duration that the third received signal strength or the third signal quality maintains a third signal strength or signal quality requirement (for example, the third received signal strength or the third signal quality being above the third threshold). The first duration, the second duration and the third duration may have pre-determined/preconfigured values. The first duration, the second duration and the third duration may be configurable. For example, the first UE may receive configuration parameters (e.g., in or more RRC messages) indicating the first duration, the second duration and the third duration. In an example, the first UE may receive the one or more messages from the RAN node.

In some example, the first UE may determine to switch between the first connectivity state to the second connectivity state based on quality of service parameters associated with the data transmitted or received by the first UE. The quality of service parameters may comprise latency, throughput, jitter, etc. For example, the first UE may determine the quality of service parameters associated with the data transmitted or received by the first UE based on priority tags associated with the data. For example, the first UE may utilize the first interface (e.g., the Uu interface) and the second interface (e.g., the PC-5 interface) in the first connectivity state and may utilize the third interface (e.g., the satellite/airborne interface) in the second connectivity state. The first UE may switch from the first connectivity state to the second connectivity state if the latency incurred by the third interface satisfies a latency requirement of the data packets. The first UE may determine the latency requirement of the data packets based on the priority tags associated with the data packets. The priority tag of the data packets may indicate the type/application of the data packets. The type/application of the data packets may include safety related information, data associated with firefighters or government agencies, data associated with autonomous driving, and traffic information.

In an embodiment, a first user equipment (UE), may maintain a plurality of interfaces comprising: a first interface defined between the first UE and a radio access network (RAN) infrastructure node; a second interface defined between the first UE and a second UE; and a third interface defined between the first UE and a satellite node or an airborne node. The first UE may switch between a first connectivity state and a second connectivity state based on at least one of: a first received signal strength or a first signal quality associated with the first interface; a second signal strength or a second signal equality associated with the second interface; and a third signal strength or a third signal quality associated with the third interface. The first UE may utilize one or more first interfaces, of the plurality of interfaces, in the first connectivity state; and the first UE may utilize one or more second interfaces, of the plurality of interfaces, in the second connectivity state.

In some examples, the first UE may utilize the first interface and the second interface in the first connectivity state; and the first UE may utilize the third interface in the second connectivity state.

In some examples, a signal strength associated with an interface may be based on a reference signal strength indicator (RSSI) or a reference signal received power (RSRP) of a reference signal received via the interface; and a signal quality associated with an interface is based on a reference signal received quality (RSRQ) of a reference signal received via the interface. In some examples, the first UE may receive configuration parameters of one or more reference signals for determining the first received signal strength or the first signal quality, the second received signal strength or the second signal quality, and the third received signal strength or the third signal quality.

In some examples, the RAN infrastructure node may be a base station.

In some examples, the first interface may be a Uu interface. In some examples, the Uu interface may be based on a first plurality of protocol terminations between the first UE and the RAN infrastructure node.

In some examples, the second interface may be a PC-5 interface. In some examples, the PC-5 interface may be based on a second plurality of protocol terminations between the first UE and the second UE.

In some examples, the third interface is a satellite/airborne interface. In some examples, the satellite/airborne interface may be based on a third plurality of protocol terminations between the first UE and the satellite node or the airborne node.

In some examples, the switching between the first connectivity state to the second connectivity state may be based on: comparing the first received signal strength or the first signal quality, associated with the first interface, with a first threshold; comparing the second received signal strength or the second signal quality, associated with the second interface, with a second threshold; and comparing the third received signal strength or the third signal quality, associated with the third interface, with a third threshold. In some examples, the switching between the first connectivity state and the second connectivity state is based on one or more trigger events. In some examples, the first threshold, the second threshold and the third threshold have pre-determined values. In some examples, the first UE may receive configuration parameters indicating the first threshold, the second threshold and the third threshold. In some examples, the receiving the configuration parameters may be from the RAN infrastructure node and via the first interface. In some examples, the receiving the configuration parameters may be based on receiving one or more radio resource control (RRC) messages.

In some examples, the switching between the first connectivity state and the second connectivity state may further be based on quality of service requirements of data packets transmitted or received by the first UE. In some examples, the first UE may utilize the first interface and the second interface in the first connectivity state; the first UE may utilize the third interface the second connectivity state; and the first UE may switch from the first connectivity state to the second connectivity state based a latency incurred by the third interface satisfying a latency requirement of the data packets. In some examples, the first UE may determine the quality of service requirements of the data packets based on priority tags of the data packets. In some examples, the priority tags of the data packets may indicate that the data packets are associated with one or more of: safety related information; firefighters or government agencies; autonomous driving; and traffic information.

In some examples, the first UE may synchronize the connectivity state of the first UE with a Global Navigation Satellite System (GNSS).

In some examples, the maintaining the first interface, the second interface and the third interface may comprise registering by the first UE with a Core Network node; and a context of the first UE associated with the first interface, the second interface and the third interface may be established in the Core Network.

In some examples, the switching from the first connectivity state to the second connectivity state is further based on one or more of: a first duration that the first received signal strength or the first signal quality maintains a first signal strength or signal quality requirement; a second duration that the second received signal strength or the second signal quality maintains a second signal strength or signal quality requirement; and a third duration that the third received signal strength or the third signal quality maintains a third signal strength or signal quality requirement. In an example, the first UE may utilize the first interface and the second interface in the first connectivity state; the first UE may utilize the third interface the second connectivity state;

and the first UE may switch from the first connectivity state to the second connectivity state based on: the first duration being smaller than a first duration threshold or the second duration being smaller than a second duration threshold; and the third duration being larger than a third duration threshold. In an example, the first duration threshold, the second duration threshold and the third duration threshold may have pre-determined values.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of wireless communications, comprising:

maintaining, by a first user equipment (UE), a plurality of interfaces including a first interface between the first UE and a radio access network (RAN) infrastructure node, a second interface between the first UE and a second UE and a third interface between the first UE and a satellite node or an airborne node;

switching, by the first UE, between a first connectivity state and a second connectivity state based on at least one of:

a first signal attribute associated with the first interface, the first signal attribute determined based on a measurement of at a signal strength or a signal quality associated with the first interface;

a second signal attribute associated with the second interface, the second signal attribute determined based on a measurement of at a signal strength or a signal quality associated with the second interface; and a third signal attribute associated with the third interface, the third signal attribute determined based on a measurement of at a signal strength or a signal quality associated with the third interface;

wherein:

the first UE communicates in accordance with at least one of the first interface and the second interface when the first UE is determined to be in the first connectivity state; and the first UE communicates in accordance with at least one of the second interface and the third interface when the first UE is determined to be in the second connectivity state.

Clause 2. The method of Clause 1, wherein:
the first user equipment (UE) communicates in accordance with the first interface and the second interface when the first UE is determined to be in the first connectivity state; and
the first UE communicates in accordance with the third interface when the first UE is determined to be in the second connectivity state.

Clause 3. The method of Clause 1, wherein a signal strength attribute associated with at least one of the first signal attribute, the second signal attribute and the third signal attribute is based on a reference signal strength indicator (RSSI) or a reference signal received power (RSRP) of a reference signal received via a respective signal interface.

Clause 4. The method of Clause 1, wherein a signal quality attribute associated with at least one of the first signal attribute, the second signal attribute and the third signal attribute is based on a reference signal received quality (RSRQ) of a reference signal received via a respective interface.

Clause 5. The method of Clause 1 further comprising receiving configuration parameters of one or more reference signals for determining at least one of the first signal attribute, the second signal attribute or third signal attribute.

Clause 6. The method of Clause 1, wherein the radio access network (RAN) infrastructure node is a base station.

Clause 7. The method of Clause 1, wherein the first interface is a Uu interface.

Clause 8. The method of Clause 7, wherein the Uu interface is based on a first plurality of protocol terminations between the first user equipment (UE) and the radio access network (RAN) infrastructure node.

Clause 9. The method of Clause 1, wherein the second interface is a PC-5 interface.

Clause 10. The method of Clause 9, wherein the PC-5 interface is based on a second plurality of protocol terminations between the first user equipment (UE) and the second UE.

Clause 11. The method of Clause 1, wherein the third interface is a satellite/airborne interface.

Clause 12. The method of Clause 11, wherein the satellite/airborne interface is based on a third plurality of protocol terminations between the first user equipment (UE) and the satellite node or the airborne node.

Clause 13. The method of Clause 1, wherein the switching between the first connectivity state to the second connectivity state is based on:
comparing the first signal attribute with a first threshold;
comparing the second signal attribute with a second threshold; and
comparing the third signal attribute with a third threshold.

Clause 14. The method of Clause 13, wherein the switching between the first connectivity state and the second connectivity state is further based on one or more trigger events.

Clause 15. The method of Clause 13, wherein the first threshold, the second threshold and the third threshold are pre-determined.

Clause 16. The method of Clause 13 further comprising receiving, by the first user equipment (UE), configuration parameters indicating the first threshold, the second threshold and the third threshold.

Clause 17. The method of Clause 16, wherein the configuration parameters are received from the radio access network (RAN) infrastructure node and via the first interface.

Clause 18. The method of Clause 17, wherein receiving the configuration parameters includes receiving one or more radio resource control (RRC) messages.

Clause 19. The method of Clause 1, wherein the switching between the first connectivity state and the second connectivity state is further based on quality of service (QoS) requirements of data packets transmitted or received by the first UE.

Clause 20. The method of Clause 19, wherein:
the first user equipment (UE) communicates in accordance with the first interface and the second interface when the first UE is determined to be in the first connectivity state;
the first UE communicates in accordance with the third interface when the first UE is determined to be in the second connectivity state; and
the first UE switches from the first connectivity state to the second connectivity state based on a determination that a latency associated with communications associated with the third interface match a latency requirement of the data packets.

Clause 21. The method of Clause 19 further comprising, determining by the first user equipment (UE), the quality of service (QoS) requirements of the data packets based on priority tags of the data packets.

Clause 22. The method of Clause 21, wherein the priority tags of the data packets indicate that the data packets are associated with one or more of:
safety related information;
firefighters or government agencies;
autonomous driving; and
traffic information.

Clause 23. The method of Clause 1 further comprising synchronizing the connectivity state of the first user equipment (UE) with a Global Navigation Satellite System (GNSS).

Clause 24. The method of Clause 1, wherein:
the maintaining the first interface, the second interface and the third interface comprises registering by the first user equipment (UE) with a Core Network node, wherein a context of the first UE associated with the first interface, the second interface and the third interface is established in the Core Network.

Clause 25. The method of Clause 1, wherein the switching from the first connectivity state to the second connectivity state is further based on one or more of:
a first duration for which the first signal attribute maintains at least one of a first signal strength or signal quality requirement;
a second duration for which the second signal attributes maintains at least one of a second signal strength or signal quality requirement; and
a third duration for which the third signal attribute maintains at least one of a third signal strength or signal quality requirement.

Clause 26. The method of Clause 25, wherein
the first user equipment (UE) communications in accordance with the first interface and the second interface when the first UE is determined to be in the first connectivity state;
wherein the first UE communicates in accordance with the third interface when the first UE is determined to be in the second connectivity state; and
the first UE switches from the first connectivity state to the second connectivity state when the first duration is smaller than a first duration threshold or the second duration is smaller than a second duration threshold, and, the third duration is larger than a third duration threshold.

Clause 27. The method of Clause 26 further comprising receiving, by the first user equipment (UE), configuration parameters indicating the first duration threshold, the second duration threshold and the third duration threshold.

Clause 28. The method of Clause 26, wherein the first duration threshold, the second duration threshold and the third duration threshold are pre-determined values.

Clause 29. A method of wireless communications, comprising:

maintaining, by a first user equipment (UE), a plurality of interfaces including between the first UE and a set of network components associated with wireless communication, wherein the plurality of interfaces facilitate communication of data packets associated with Vehicle to Anything (V2X) services and wherein the plurality of interfaces include a first interface between the first UE and a radio access network (RAN) infrastructure node, a second interface between the first UE and a second UE and a third interface between the first UE and a satellite node or an airborne node;

managing at least one of receipt or transmission of V2X data packets based on a determined connectivity state of the of the first UE, wherein managing the at least one of receipt or transmission of V2X data packets is based on switching, by the first UE, between a first connectivity state and a second connectivity state based on signal attributes associated with at least one of the first, second or third interfaces;

wherein:

the first UE communicates in accordance with at least one of the first interface and the second interface when the first UE is determined to be in the first connectivity state; and the first UE communicates in accordance with at least one of the second interface and the third interface when the first UE is determined to be in the second connectivity state.

Clause 30. The method of Clause 29, wherein:

the first user equipment (UE) communicates in accordance with the first interface and the second interface when the first UE is determined to be in the first connectivity state; and the first UE communicates in accordance with the third interface when the first UE is determined to be in the second connectivity state.

Clause 31. The method of Clause 29, wherein a signal strength attribute associated with at least one of a first signal attribute, a second signal attribute and a third signal attribute is based on a reference signal strength indicator (RSSI) or a reference signal received power (RSRP) of a reference signal received via a respective signal interface.

Clause 32. The method of Clause 29, wherein a signal quality attribute associated with at least one of a first signal attribute, a second signal attribute and a third signal attribute is based on a reference signal received quality (RSRQ) of a reference signal received via a respective interface.

Clause 33. The method of Clause 32 further comprising receiving configuration parameters of one or more reference signals for determining at least one of the first signal attribute, the second signal attribute or third signal attribute.

Clause 34. The method of Clause 29, wherein the switching between the first connectivity state to the second connectivity state is based on:

comparing a first signal attribute with a first threshold;

comparing a second signal attribute with a second threshold; and comparing a third signal attribute with a third threshold.

Clause 35. The method of Clause 34, wherein the switching between the first connectivity state and the second connectivity state is further based on one or more trigger events.

Clause 36. The method of Clause 29, wherein the switching between the first connectivity state and the second connectivity state is further based on quality of service (QoS) requirements of data packets transmitted or received by the first UE.

Clause 37. The method of Clause 29, wherein:

the first user equipment (UE) communicates in accordance with the first interface and the second interface when the first UE is determined to be in the first connectivity state;

the first UE communicates in accordance with the third interface when the first UE is determined to be in the second connectivity state; and the first UE switches from the first connectivity state to the second connectivity state based on a determination that a latency associated with communications associated with the third interface match a latency requirement of the data packets.

Clause 38. The method of Clause 29, wherein the switching from the first connectivity state to the second connectivity state is further based on one or more of:

a first duration for which a first signal attribute maintains at least one of a first signal strength or signal quality requirement;

a second duration for which a second signal attributes maintains at least one of a second signal strength or signal quality requirement; and a third duration for which a third signal attribute maintains at least one of a third signal strength or signal quality requirement.

Clause 39. The method of Clause 38, wherein the first user equipment (UE) communications in accordance with the first interface and the second interface when the first UE is determined to be in the first connectivity state;

wherein the first UE communicates in accordance with the third interface when the first UE is determined to be in the second connectivity state; and the first UE switches from the first connectivity state to the second connectivity state when the first duration is smaller than a first duration threshold or the second duration is smaller than a second duration threshold, and, the third duration is larger than a third duration threshold.

Clause 40. An apparatus for utilization in wireless communications comprising:

an antenna for use in transmission of electromagnetic signals;

a memory for maintaining computer-readable code; and a processor for executing the computer-readable code that causes the apparatus to maintain a plurality of interfaces including between the apparatus and a set of network components associated with wireless communication, wherein the plurality of interfaces facilitate communication of data packets associated with Vehicle to Anything (V2X) services and wherein the plurality of interfaces include a first interface between the apparatus and a radio access network (RAN) infrastructure node, a second interface between the apparatus and a second UE and a third interface between the apparatus and a satellite node or an airborne node;

manage at least one of receipt or transmission of V2X data packets based on a determined connectivity state of the of the apparatus, wherein managing the at least one of receipt or transmission of V2X data packets is based on switching, by the apparatus, between a first connectivity state and a second connectivity state based on signal attributes associated with at least one of the first, second or third interfaces;
wherein:
the apparatus communicates in accordance with at least one of the first interface and the second interface when the apparatus is determined to be in the first connectivity state; and
the apparatus communicates in accordance with at least one of the second interface and the third interface when the apparatus is determined to be in the second connectivity state.

Clause 41. The apparatus of Clause 40, wherein:
the apparatus communicates in accordance with the first interface and the second interface when the apparatus is determined to be in the first connectivity state; and
the apparatus communicates in accordance with the third interface when the apparatus is determined to be in the second connectivity state.

Clause 42. The method of Clause 40, wherein a signal strength attribute associated with at least one of a first signal attribute, a second signal attribute and a third signal attribute is based on a reference signal strength indicator (RSSI) or a reference signal received power (RSRP) of a reference signal received via a respective signal interface.

Clause 43. The apparatus of Clause 40, wherein a signal quality attribute associated with at least one of a first signal attribute, a second signal attribute and a third signal attribute is based on a reference signal received quality (RSRQ) of a reference signal received via a respective interface.

Clause 44. The apparatus of Clause 43 further comprising receiving configuration parameters of one or more reference signals for determining at least one of the first signal attribute, the second signal attribute or third signal attribute.

Clause 45. The apparatus of Clause 40, wherein the switching between the first connectivity state to the second connectivity state is based on:
comparing a first signal attribute with a first threshold;
comparing a second signal attribute with a second threshold; and
comparing a third signal attribute with a third threshold.

Clause 46. The apparatus of Clause 45, wherein the switching between the first connectivity state and the second connectivity state is further based on one or more trigger events.

Clause 47. The apparatus of Clause 40, wherein the switching between the first connectivity state and the second connectivity state is further based on quality of service (QoS) requirements of data packets transmitted or received by the apparatus.

Clause 48. The apparatus of Clause 40, wherein:
the apparatus communicates in accordance with the first interface and the second interface when the apparatus is determined to be in the first connectivity state;
the apparatus communicates in accordance with the third interface when the apparatus is determined to be in the second connectivity state; and
the apparatus switches from the first connectivity state to the second connectivity state based on a determination that a latency associated with communications associated with the third interface match a latency requirement of the data packets.

Clause 49. The apparatus of Clause 40, wherein the switching from the first connectivity state to the second connectivity state is further based on one or more of:
a first duration for which a first signal attribute maintains at least one of a first signal strength or signal quality requirement;
a second duration for which a second signal attributes maintains at least one of a second signal strength or signal quality requirement; and
a third duration for which a third signal attribute maintains at least one of a third signal strength or signal quality requirement.

Clause 50. The apparatus of Clause 49, wherein
the first user equipment (UE) communications in accordance with the first interface and the second interface when the apparatus is determined to be in the first connectivity state;
wherein the apparatus communicates in accordance with the third interface when the apparatus is determined to be in the second connectivity state; and
the apparatus switches from the first connectivity state to the second connectivity state when the first duration is smaller than a first duration threshold or the second duration is smaller than a second duration threshold, and, the third duration is larger than a third duration threshold.

The invention claimed is:

1. A method of wireless communications, comprising: maintaining, by a first user equipment (UE), a plurality of interfaces including a first interface between the first UE and a radio access network (RAN) infrastructure node, a second interface between the first UE and a second UE and a third interface between the first UE and a satellite node or an airborne node; switching, by the first UE, between a first connectivity state and a second connectivity state based on at least one of:
a first signal attribute associated with the first interface, the first signal attribute determined based on a measurement of at least a signal strength or a signal quality associated with the first interface;
a second signal attribute associated with the second interface, the second signal attribute determined based on a measurement of at least a signal strength or a signal quality associated with the second interface; and
a third signal attribute associated with the third interface, the third signal attribute determined based on a measurement of at least a signal strength or a signal quality associated with the third interface;
wherein:
the first UE communicates in accordance with at least one of the first interface and the second interface when the first UE is determined to be in the first connectivity state; and
the first UE communicates in accordance with at least one of the second interface and the third interface when the first UE is determined to be in the second connectivity state.

2. The method of claim 1, wherein:
the first user equipment (UE) communicates in accordance with the first interface and the second interface when the first UE is determined to be in the first connectivity state; and
the first UE communicates in accordance with the third interface when the first UE is determined to be in the second connectivity state.

3. The method of claim 1, wherein a signal strength attribute associated with at least one of the first signal attribute, the second signal attribute and the third signal attribute is based on a reference signal strength indicator (RSSI) or a reference signal received power (RSRP) of a reference signal received via a respective signal interface.

4. The method of claim 1, wherein a signal quality attribute associated with at least one of the first signal attribute, the second signal attribute and the third signal attribute is based on a reference signal received quality (RSRQ) of a reference signal received via a respective interface.

5. The method of claim 1 further comprising receiving configuration parameters of one or more reference signals for determining at least one of the first signal attribute, the second signal attribute or third signal attribute.

6. The method of claim 1, wherein the radio access network (RAN) infrastructure node is a base station.

7. The method of claim 1, wherein the first interface is a Uu interface.

8. The method of claim 7, wherein the Uu interface is based on a first plurality of protocol terminations between the first user equipment (UE) and the radio access network (RAN) infrastructure node.

9. The method of claim 1, wherein the second interface is a PC-5 interface.

10. The method of claim 9, wherein the PC-5 interface is based on a second plurality of protocol terminations between the first user equipment (UE) and the second UE.

11. The method of claim 1, wherein the third interface is a satellite/airborne interface.

12. The method of claim 11, wherein the satellite/airborne interface is based on a third plurality of protocol terminations between the first user equipment (UE) and the satellite node or the airborne node.

13. The method of claim 1, wherein the switching between the first connectivity state to the second connectivity state is based on:
comparing the first signal attribute with a first threshold;
comparing the second signal attribute with a second threshold; and
comparing the third signal attribute with a third threshold.

14. The method of claim 13, wherein the switching between the first connectivity state and the second connectivity state is further based on one or more trigger events.

15. The method of claim 13, wherein the first threshold, the second threshold and the third threshold are pre-determined.

16. The method of claim 13 further comprising receiving, by the first user equipment (UE), configuration parameters indicating the first threshold, the second threshold and the third threshold.

17. The method of claim 16, wherein the configuration parameters are received from the radio access network (RAN) infrastructure node and via the first interface.

18. The method of claim 17, wherein receiving the configuration parameters includes receiving one or more radio resource control (RRC) messages.

19. The method of claim 1, wherein the switching between the first connectivity state and the second connectivity state is further based on quality of service (QoS) requirements of data packets transmitted or received by the first UE.

20. The method of claim 19, wherein:
the first user equipment (UE) communicates in accordance with the first interface and the second interface when the first UE is determined to be in the first connectivity state;
the first UE communicates in accordance with the third interface when the first UE is determined to be in the second connectivity state; and
the first UE switches from the first connectivity state to the second connectivity state based on a determination that a latency associated with communications associated with the third interface match a latency requirement of the data packets.

21. The method of claim 19 further comprising, determining by the first user equipment (UE), the quality of service (QoS) requirements of the data packets based on priority tags of the data packets.

22. The method of claim 21, wherein the priority tags of the data packets indicate that the data packets are associated with one or more of:
safety related information;
firefighters or government agencies;
autonomous driving; and
traffic information.

23. The method of claim 1 further comprising synchronizing the connectivity state of the first user equipment (UE) with a Global Navigation Satellite System (GNSS).

24. The method of claim 1, wherein:
the maintaining the first interface, the second interface and the third interface comprises registering by the first user equipment (UE) with a Core Network node, wherein a context of the first UE associated with the first interface, the second interface and the third interface is established in the Core Network.

25. The method of claim 1, wherein the switching from the first connectivity state to the second connectivity state is further based on one or more of:
a first duration for which the first signal attribute maintains at least one of a first signal strength or signal quality requirement;
a second duration for which the second signal attributes maintains at least one of a second signal strength or signal quality requirement; and
a third duration for which the third signal attribute maintains at least one of a third signal strength or signal quality requirement.

26. The method of claim 25, wherein
the first user equipment (UE) communications in accordance with the first interface and the second interface when the first UE is determined to be in the first connectivity state;
wherein the first UE communicates in accordance with the third interface when the first UE is determined to be in the second connectivity state; and
the first UE switches from the first connectivity state to the second connectivity state when the first duration is smaller than a first duration threshold or the second duration is smaller than a second duration threshold, and, the third duration is larger than a third duration threshold.

27. The method of claim 26 further comprising receiving, by the first user equipment (UE), configuration parameters indicating the first duration threshold, the second duration threshold and the third duration threshold.

28. The method of claim 26, wherein the first duration threshold, the second duration threshold and the third duration threshold are pre-determined values.

29. A method of wireless communications, comprising:
maintaining, by a first user equipment (UE), a plurality of interfaces including between the first UE and a set of network components associated with wireless communication, wherein the plurality of interfaces facilitate communication of data packets associated with Vehicle to Anything (V2X) services and wherein the plurality of interfaces include a first interface between the first UE and a radio access network (RAN) infrastructure node, a second interface between the first UE and a second UE and a third interface between the first UE and a satellite node or an airborne node;

managing at least one of receipt or transmission of V2X data packets based on a determined connectivity state of the of the first UE, wherein managing the at least one of receipt or transmission of V2X data packets is based on switching, by the first UE, between a first connectivity state and a second connectivity state based on signal attributes associated with at least one of the first, second or third interfaces;

wherein:
the first UE communicates in accordance with at least one of the first interface and the second interface when the first UE is determined to be in the first connectivity state; and
the first UE communicates in accordance with at least one of the second interface and the third interface when the first UE is determined to be in the second connectivity state.

30. The method of claim 29, wherein:
the first user equipment (UE) communicates in accordance with the first interface and the second interface when the first UE is determined to be in the first connectivity state; and
the first UE communicates in accordance with the third interface when the first UE is determined to be in the second connectivity state.

31. The method of claim 29, wherein a signal strength attribute associated with at least one of a first signal attribute, a second signal attribute and a third signal attribute is based on a reference signal strength indicator (RSSI) or a reference signal received power (RSRP) of a reference signal received via a respective signal interface.

32. The method of claim 29, wherein a signal quality attribute associated with at least one of a first signal attribute, a second signal attribute and a third signal attribute is based on a reference signal received quality (RSRQ) of a reference signal received via a respective interface.

33. The method of claim 32 further comprising receiving configuration parameters of one or more reference signals for determining at least one of the first signal attribute, the second signal attribute or third signal attribute.

34. The method of claim 29, wherein the switching between the first connectivity state to the second connectivity state is based on:
comparing a first signal attribute with a first threshold;
comparing a second signal attribute with a second threshold; and
comparing a third signal attribute with a third threshold.

35. The method of claim 34, wherein the switching between the first connectivity state and the second connectivity state is further based on one or more trigger events.

36. The method of claim 29, wherein the switching between the first connectivity state and the second connectivity state is further based on quality of service (QoS) requirements of data packets transmitted or received by the first UE.

37. The method of claim 29, wherein:
the first user equipment (UE) communicates in accordance with the first interface and the second interface when the first UE is determined to be in the first connectivity state;
the first UE communicates in accordance with the third interface when the first UE is determined to be in the second connectivity state; and
the first UE switches from the first connectivity state to the second connectivity state based on a determination that a latency associated with communications associated with the third interface match a latency requirement of the data packets.

38. The method of claim 29, wherein the switching from the first connectivity state to the second connectivity state is further based on one or more of:
a first duration for which a first signal attribute maintains at least one of a first signal strength or signal quality requirement;
a second duration for which a second signal attributes maintains at least one of a second signal strength or signal quality requirement; and
a third duration for which a third signal attribute maintains at least one of a third signal strength or signal quality requirement.

39. The method of claim 38, wherein
the first user equipment (UE) communications in accordance with the first interface and the second interface when the first UE is determined to be in the first connectivity state;
wherein the first UE communicates in accordance with the third interface when the first UE is determined to be in the second connectivity state; and
the first UE switches from the first connectivity state to the second connectivity state when the first duration is smaller than a first duration threshold or the second duration is smaller than a second duration threshold, and, the third duration is larger than a third duration threshold.

* * * * *